(12) United States Patent
Enomoto et al.

(10) Patent No.: US 10,479,170 B2
(45) Date of Patent: Nov. 19, 2019

(54) AIR CONDITIONER FOR VEHICLE

(71) Applicant: DENSO CORPORATION, Kariya, Aichi-pref. (JP)

(72) Inventors: Norihiko Enomoto, Kariya (JP); Nobuharu Kakehashi, Kariya (JP); Yasumitsu Omi, Kariya (JP); Masamichi Makihara, Kariya (JP); Hiroshi Kishita, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 303 days.

(21) Appl. No.: 15/113,856

(22) PCT Filed: Jan. 26, 2015

(86) PCT No.: PCT/JP2015/000322
§ 371 (c)(1),
(2) Date: Jul. 25, 2016

(87) PCT Pub. No.: WO2015/115082
PCT Pub. Date: Aug. 6, 2015

(65) Prior Publication Data
US 2016/0339767 A1    Nov. 24, 2016

(30) Foreign Application Priority Data

Jan. 29, 2014 (JP) .................................. 2014-014099
Dec. 25, 2014 (JP) .................................. 2014-262643

(51) Int. Cl.
*B60H 1/32* (2006.01)
*F25B 25/00* (2006.01)
(Continued)

(52) U.S. Cl.
CPC ........... *B60H 1/3207* (2013.01); *B60H 1/004* (2013.01); *B60H 1/00278* (2013.01);
(Continued)

(58) Field of Classification Search
None
See application file for complete search history.

(56) References Cited

U.S. PATENT DOCUMENTS

| 7,797,954 B2* | 9/2010 | Duhme | B60H 1/00278 62/184 |
| 2002/0014330 A1* | 2/2002 | Guyonvarch | B60H 1/00007 165/202 |

(Continued)

FOREIGN PATENT DOCUMENTS

| JP | H07089340 A | 4/1995 |
| JP | 2003220826 A | 8/2003 |

(Continued)

OTHER PUBLICATIONS

English Translation of Description, JP2012116276A.*

*Primary Examiner* — Jonathan Bradford
(74) *Attorney, Agent, or Firm* — Harness, Dickey & Pierce, P.L.C.

(57) ABSTRACT

An air conditioner for a vehicle includes a pump that draws and discharges a heat medium, a cooler core that exchanges sensible heat between the heat medium and ventilation air into a vehicle interior to cool and dehumidify the ventilation air, a heat-medium and outside-air heat exchanger that exchanges sensible heat between the heat medium and outside air, a compressor adapted to draw and discharge a refrigerant in a refrigeration cycle, a heat-medium cooling heat exchanger that cools the heat medium by exchanging heat between a low-pressure side refrigerant in the refrigeration cycle and the heat medium, and first and second switching valves that switch between a first dehumidification mode for circulation of the heat medium between the cooler core and the heat-medium cooling heat exchanger and (Continued)

a second dehumidification mode for circulation of the heat medium between the cooler core and the heat-medium and outside-air heat exchanger.

33 Claims, 13 Drawing Sheets

(51) Int. Cl.
*F25B 29/00* (2006.01)
*B60H 1/00* (2006.01)

(52) U.S. Cl.
CPC ..... *B60H 1/00428* (2013.01); *B60H 1/00785* (2013.01); *B60H 1/00864* (2013.01); *B60H 1/00899* (2013.01); *B60H 1/323* (2013.01); *B60H 1/32281* (2019.05); *F25B 25/005* (2013.01); *F25B 29/003* (2013.01); *B60H 2001/00307* (2013.01); *B60H 2001/00928* (2013.01); *B60H 2001/00957* (2013.01); *B60H 2001/3245* (2013.01); *B60H 2001/3255* (2013.01); *B60H 2001/3266* (2013.01); *B60H 2001/3291* (2013.01); *F25B 2339/047* (2013.01); *F25B 2700/1931* (2013.01); *F25B 2700/1933* (2013.01); *F25B 2700/21151* (2013.01); *F25B 2700/21152* (2013.01)

(56) References Cited

U.S. PATENT DOCUMENTS

| | | | |
|---|---|---|---|
| 2013/0055743 A1* | 3/2013 | Ogasawara | B60H 1/00914 62/156 |
| 2013/0061627 A1 | 3/2013 | Neumeister et al. | |
| 2015/0128632 A1* | 5/2015 | Kishita | B60H 1/00271 62/324.6 |
| 2015/0165868 A1* | 6/2015 | Kim | B60H 1/00764 62/89 |
| 2016/0109163 A1 | 4/2016 | Enomoto et al. | |

FOREIGN PATENT DOCUMENTS

| | | |
|---|---|---|
| JP | 2012116276 A | 6/2012 |
| JP | 2013060190 A | 4/2013 |

* cited by examiner

AIR CONDITIONER FOR VEHICLE

CROSS REFERENCE TO RELATED APPLICATIONS

This application is a U.S. National Phase Application under 35 U.S.C. 371 of International Application No. PCT/JP2015/000322 filed on Jan. 26, 2015 and published in Japanese as WO 2015/115082 A1 on Aug. 6, 2015. This application is based on and claims the benefit of priority from Japanese Patent Applications No. 2014-014099 filed on Jan. 29, 2014, and No. 2014-262643 filed on Dec. 25, 2014. The entire disclosures of all of the above applications are incorporated herein by reference.

FIELD OF THE INVENTION

The present disclosure relates to air conditioners for use in vehicles.

BACKGROUND ART

A conventional air conditioner for a vehicle includes an evaporator that cools and dehumidifies ventilation air to be blown into a vehicle interior by exchanging heat between a low-pressure side refrigerant in a refrigeration cycle and the ventilation air within the vehicle interior. When intended to suppress fog on a window glass using an inside-air circulation mode of air-conditioning by circulating the inside air without introducing the outside air into the vehicle interior, a compressor in the refrigeration cycle is operated, causing the evaporator to dehumidify the ventilation air in the vehicle interior.

Thus, the compressor consumes power in suppressing the fog on the window glass. Specifically, when the compressor is an electric compressor, its operation consumes electric power. In contrast, when the compressor is an engine-driven compressor, its operation leads to a deterioration of fuel efficiency, a reduction of output from the engine, and degradation in engine feeling.

In the related art, Patent Document 1 describes an air conditioner for a vehicle that can ensure the antifogging properties and fuel-saving properties by improving the determination accuracy when the window glass actually becomes fogged. With this structure, the frequency of operating the compressor to suppress fog on the window can be decreased, thereby reducing the power consumed for antifogging of the window glass.

RELATED ART DOCUMENT

Patent Document

[Patent Document 1] Japanese Unexamined Patent Application Publication No. 2013-60190

SUMMARY OF INVENTION

However, based on studies undertaken by the inventors of the present application, in the related art disclosed in Patent Document 1, the compressor must be operated when a window glass is actually fogged, even though the frequency of operating the compressor for suppressing fog on the window glass can be decreased, which means the power saving is limited.

The present disclosure has been made in view of the foregoing matter, and it is an object of the present disclosure to reduce power required to suppress fog on a window glass.

An air conditioner for a vehicle according to a first aspect of the present disclosure includes: a pump drawing and discharging a heat medium to circulate the heat medium; an air-cooling heat exchanger that exchanges sensible heat between the heat medium circulating by the pump and ventilation air to be blown into a vehicle interior to cool and dehumidify the ventilation air; a heat-medium and outside-air heat exchanger that exchanges sensible heat between the heat medium and outside air; a compressor adapted to draw and discharge a refrigerant in a refrigeration cycle; a heat-medium cooling heat exchanger that cools the heat medium by exchanging heat between a low-pressure side refrigerant in the refrigeration cycle and the heat medium; and a dehumidification mode switching portion that switches between a first dehumidification mode for circulation of the heat medium between the air-cooling heat exchanger and the heat-medium cooling heat exchanger, and a second dehumidification mode for circulation of the heat medium between the air-cooling heat exchanger and the heat-medium and outside-air heat exchanger.

Thus, in the second dehumidification mode, the coolant cooled by the outside air in the heat-medium and outside-air heat exchanger is allowed to circulate through the air-cooling heat exchanger, thereby enabling dehumidification of the ventilation air to be blown into the vehicle interior.

Accordingly, the second dehumidification mode can reduce power required to suppress fog on a window glass, compared with the first dehumidification mode in which the coolant cooled by a low-pressure side refrigerant in the refrigeration cycle at the heat-medium cooling heat exchanger is allowed to circulate through the air-cooling heat exchanger, thereby dehumidifying the ventilation air to be blown into the vehicle interior.

An air conditioner for a vehicle according to a second aspect of the present disclosure includes: a pump adapted to draw and discharge a heat medium; a heat-medium and outside-air heat exchanger that exchanges sensible heat between the heat medium and outside air; an air-cooling heat exchanger that exchanges sensible heat between the heat medium and ventilation air to be blown into a vehicle interior; and a controller that allows the heat medium to circulate between the air-cooing heat exchanger and the heat-medium and outside-air heat exchanger when a temperature in connection with a temperature of the outside air is estimated or determined to be less than a temperature in connection with a dew-point temperature of the ventilation air flowing into the air-cooling heat exchanger.

Thus, when the outside-air temperature is low, the coolant cooled by the outside air at the heat-medium and outside-air heat exchanger is allowed to circulate through the air-cooling heat exchanger, thereby dehumidifying the ventilation air to be blown into the vehicle interior, which can reduce the power required to suppress fog on the window glass.

DESCRIPTION OF EMBODIMENTS

Figure 1:
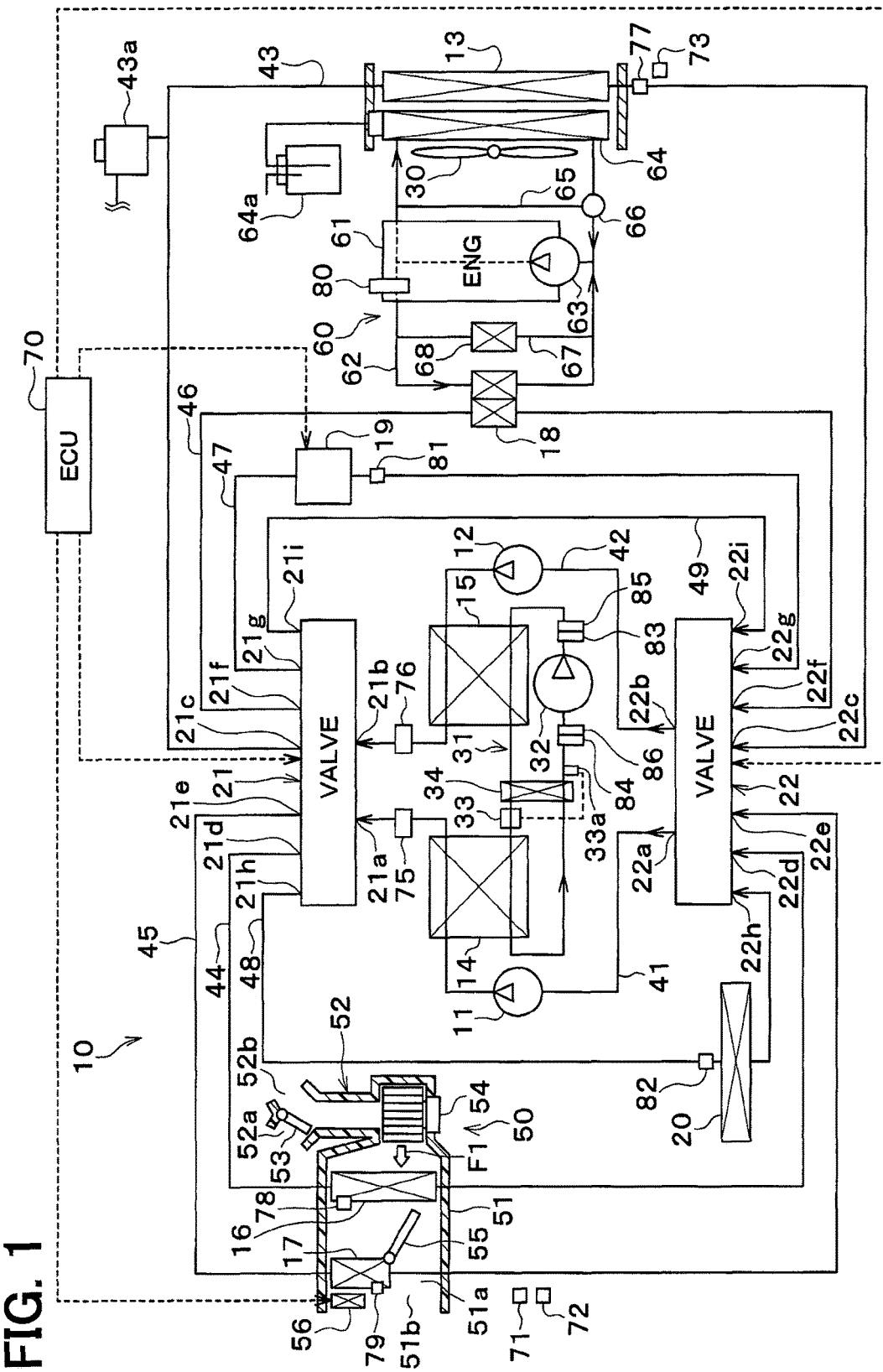
FIG. 1 is an entire configuration diagram of a thermal management system for a vehicle according to a first embodiment.

In the following, embodiments will be described with reference to the accompanying drawings. Note that in the respective embodiments below, the same or equivalent parts are indicated by the same reference characters throughout the figures.

First Embodiment

A thermal management system 10 for a vehicle shown in FIG. 1 is used to adjust various devices mounted on a vehicle or an interior of the vehicle to an appropriate temperature. In this embodiment, the vehicle thermal management system 10 is applied to a hybrid vehicle that can obtain the driving force for traveling of a vehicle from both an engine (internal combustion engine) and an electric motor for traveling (motor generator).

The hybrid car of this embodiment is configured as a plug-in hybrid car that can charge the battery (vehicle-mounted battery) mounted on the vehicle, with power supplied from an external power source (commercial power source) during stopping of the vehicle. For example, a lithium ion battery can be used as the battery.

The driving force output from the engine is used not only as a driving force for traveling of the vehicle, but also as a force for operating a generator. Power generated by the generator and power supplied from an external power source can be stored in the battery. The battery can also store the power regenerated (regenerated energy) by the electric motor for traveling during deceleration or descending a slope.

The power stored in the battery is supplied not only to the electric motor for traveling, but also to various vehicle-mounted devices, such as electric components included in the vehicle thermal management system 10.

The plug-in hybrid vehicle is brought into an EV traveling mode when the state of charge SOC of the battery is equal to or more than a prescribed traveling reference remaining level upon start of traveling by previously charging the battery with power from the external power source during stopping of the vehicle before the start-up of the traveling. The EV traveling mode is a traveling mode in which the vehicle travels by the driving force output from the traveling electric motor.

On the other hand, when the state of charge SOC of the battery is lower than the traveling reference remaining level during traveling, the vehicle is brought into an HV traveling mode. The HV traveling mode is a traveling mode in which the vehicle travels by the driving force output mainly from the engine 61. If the load on traveling vehicle becomes high, the traveling electric motor is operated to assist the engine 61.

The plug-in hybrid vehicle of this embodiment switches between the EV traveling mode and the HV traveling mode in this way to suppress the consumption of fuel of the engine 61 to improve the fuel efficiency of the vehicle, as compared to the normal vehicles that can obtain the driving force for traveling only from the engine 61. Switching between the EV traveling mode and the HV traveling mode is controlled by a driving force controller (not shown).

As shown in FIG. 1, the vehicle thermal management system 10 includes a first pump 11, a second pump 12, a radiator 13, a coolant cooler 14, a coolant heater 15, a cooler core 16, a heater core 17, a coolant-to-coolant heat exchanger 18, an inverter 19, a battery-temperature adjustment heat exchanger 20, a first switching valve 21, and a second switching valve 22.

Each of the first pump 11 and the second pump 12 is an electric pump for drawing and discharging the coolant (heat medium). The coolant is a fluid as the heat medium. In this embodiment, a liquid containing at least ethylene glycol, dimethylpolysiloxane, or a nanofluid, or an antifreezing solution is used as the coolant.

The first pump 11 and the second pump 12 serve as flow-rate adjustment portions that adjust the flow rates of coolant flowing through respective coolant-circulation devices.

The radiator 13, the coolant cooler 14, the coolant heater 15, the cooler core 16, the heater core 17, the coolant-to-coolant heat exchanger 18, the inverter 19, and the battery-temperature adjustment 20 are coolant circulation devices (heat-medium circulation devices) through which the coolant circulates.

The radiator 13 is a coolant-outside air heat exchanger (heat medium-outside air heat exchanger) that exchanges heat (sensible heat exchange) between the coolant and the vehicle exterior air (hereinafter referred to as the outside air). The coolant at a temperature equal to or higher than the outside air temperature is allowed to flow through the radiator 13, thereby enabling heat dissipation from the coolant into the outside air. The coolant at a temperature equal to or lower than the outside air temperature is allowed to flow through the radiator 13, thereby enabling heat absorption from the outside air into the coolant. In other words, the radiator 13 can exhibit the function of a radiator that dissipates heat from the coolant into the outside air, and the function of a heat sink that absorbs heat into the coolant from the outside air.

The radiator 13 is a heat transfer device that has a flow path through which the coolant circulates and transfers heat with the coolant having its temperature adjusted by the coolant cooler 14 or coolant heater 15.

An exterior blower 30 is an electric blower (outside-air blower) that blows the outside air to the radiator 13. The radiator 13 and the exterior blower 30 are disposed at the forefront of the vehicle. Thus, traveling air can hit the radiator 13 during traveling of the vehicle. The exterior blower 30 is a flow-rate adjustment portion for adjusting the flow rate of outside air flowing through the radiator 13.

Each of the coolant cooler (chiller) 14 and the coolant heater (water-cooled condenser) 15 is a coolant-temperature adjustment heat exchanger (heat-medium temperature adjustment heat exchanger) that adjusts the temperature of coolant by exchanging heat with the coolant. The coolant cooler 14 is a coolant-cooling heat exchanger (heat-medium cooling heat exchanger) for cooling the coolant. The coolant heater 15 is a coolant-heating heat exchanger (heat-medium heating heat exchanger) for heating the coolant.

The coolant cooler 14 is a low-pressure side heat exchanger (heat-medium heat sink) that absorbs heat in the low-pressure side refrigerant from the coolant by exchanging heat between the coolant and a low-pressure side refrigerant of a refrigeration cycle 31. The coolant cooler 14 serves as an evaporator of the refrigeration cycle 31.

The refrigeration cycle 31 is a vapor-compression refrigerator that includes a compressor 32, the coolant heater 15, an expansion valve 33, the coolant cooler 14, and an internal heat exchanger 34. The refrigeration cycle 31 of this embodiment forms a subcritical refrigeration cycle in which a high-pressure side refrigerant pressure does not exceed the critical pressure of the refrigerant, using a fluorocarbon refrigerant as the refrigerant.

The compressor 32 is an electric compressor driven by power supplied from the battery. The compressor 32 draws and compresses the refrigerant in the refrigeration cycle 31 and discharges the compressed refrigerant therefrom.

The coolant heater 15 is a condenser (high-pressure side heat exchanger) that condenses (changes a latent heat of) a high-pressure side refrigerant by exchanging heat between the high-pressure side refrigerant discharged from the compressor 32 and the coolant.

The expansion valve 33 is a decompression device that decompresses and expands a liquid-phase refrigerant flowing out of the coolant heater 15. The expansion valve 33 is a thermal expansion valve that has a temperature sensor 33a for detecting the superheat degree of the refrigerant on the outlet side of the coolant cooler 14 based on the temperature and pressure of the refrigerant on the outlet side of the coolant cooler 14. The expansion valve 33 is adapted to adjust a throttle passage area by a mechanical mechanism such that the superheat degree of the refrigerant on the outlet side of the coolant cooler 14 is within a predetermined range previously set.

The coolant cooler 14 is an evaporator that evaporates (changes a latent heat of) a low-pressure refrigerant by exchanging heat between the coolant and the low-pressure refrigerant decompressed and expanded by the expansion valve 33. The gas-phase refrigerant evaporated at the coolant cooler 14 is drawn into and compressed by the compressor 32.

The internal heat exchanger 34 is a heat exchanger that exchanges heat between the refrigerant flowing out of the coolant heater 15 and the refrigerant flowing out of the coolant cooler 14.

The refrigeration cycle 31 is a coolant cooling-heating portion (heat-medium cooling-heating portion) that has the coolant cooler 14 for cooling the coolant and the coolant heater 15 for heating the coolant. In other words, the refrigeration cycle 31 serves as a low-temperature coolant generator (low-temperature heat-medium generator) that generates a low-temperature coolant at the coolant cooler 14, and also as a high-temperature coolant generator (high-temperature heat-medium generator) that generates a high-temperature coolant at the coolant heater 15.

The radiator 13 serves to cool the coolant by the outside air, while the coolant cooler 14 serves to cool the coolant by the low-pressure refrigerant in the refrigeration cycle 31. Thus, the temperature of the coolant cooled by the coolant cooler 14 can be made lower than that of the coolant cooled by the radiator 13. Specifically, the radiator 13 cannot cool the coolant to a temperature lower than that of the outside air, whereas the coolant cooler 14 can cool the coolant to a temperature lower than that of the outside air.

The cooler core 16 and the heater core 17 are heat medium-air heat exchangers that exchange heat between the coolant having its temperature adjusted by the coolant cooler 14 and the coolant heater 15 and ventilation air to be blown into the vehicle interior, thereby adjusting the temperature of the ventilation air.

The cooler core 16 is an air-cooling heat exchanger that cools and dehumidifies ventilation air to be blown into the vehicle interior by exchanging heat (exchanging sensible heat) between the coolant and the ventilation air passing into the vehicle interior. The heater core 17 is an air-heating heat exchanger that heats ventilation air passing into the vehicle interior by exchanging heat (exchanging sensible heat) between the coolant and the ventilation air to be blown into the vehicle interior.

The coolant-to-coolant heat exchanger 18, the inverter 19, and the battery-temperature adjustment heat exchanger 20 are heat transfer devices (temperature-adjustment target devices) that have flow paths for circulation of the coolant and transfer heat to and from the coolant.

The coolant-to-coolant heat exchanger 18 is a heat exchanger (heat medium-heat medium heat exchanger) that exchanges heat between the coolant in the vehicle thermal management system 10 (the coolant circulating by the first pump 11 or second pump 12) and the coolant (engine heat medium) in an engine cooling circuit 60.

The coolant-to-coolant heat exchanger 18 constitutes an engine heat transfer portion that transfers heat between an engine 61 and the coolant circulated by the first pump 11 or second pump 12. The engine 61 is a heat generator that generates heat during its operation.

The inverter 19 is a power converter that converts a direct-current (DC) power supplied from the battery into an alternating-current (AC) voltage to output the AC voltage to the traveling electric motor. The inverter 19 is a heat generator that generates heat during its operation. The amount of heat generated by the inverter 19 changes depending on the traveling state of the vehicle. The coolant flow path in the inverter 19 serves as a device heat transfer portion that transfers heat between the heat generator and the coolant.

The battery-temperature adjustment heat exchanger 20 is a heat exchanger (heat-medium-air heat exchanger) disposed in a ventilation-air route to the battery and adapted to exchange heat between the ventilation air and the coolant. The battery-temperature adjustment heat exchanger 20 constitutes a battery heat transfer portion that transfers heat between the battery and the coolant. The battery is a heat generator that generates heat during its operation.

The first pump 11 is disposed in a first-pump flow path 41. The coolant cooler 14 is disposed on the discharge side of the first pump 11 in the first-pump flow path 41.

The second pump 12 is disposed in a second-pump flow path 42. The coolant heater 15 is disposed on the discharge side of the second pump 12 in the second-pump flow path 42.

The radiator 13 is disposed in a radiator flow path 43. The cooler core 16 is disposed in a cooler-core flow path 44. The heater core 17 is disposed in a heater-core flow path 45.

The coolant-to-coolant heat exchanger 18 is disposed in a coolant-cooler heat exchanger flow path 46. The inverter 19 is disposed in an inverter flow path 47. The battery-temperature adjustment heat exchanger 20 is disposed in a battery heat exchange flow path 48.

A reserve tank 43*a* is connected to the radiator flow path 43. The reserve tank 43*a* is an air release container (heat medium reservoir) for storing the coolant therein. Thus, the pressure at the liquid surface of the coolant stored in the reserve tank 43*a* becomes atmospheric pressure.

The reserve tank 43*a* may be configured such that the pressure at the liquid surface of the coolant stored therein becomes a predetermined pressure (pressure different from the atmospheric pressure).

Excessive coolant is stored in the reserve tank 43*a*, which can suppress the decrease in liquid amount of the coolant circulating through the respective flow paths. The reserve tank 43*a* has a function of separating the air bubbles contained in the coolant, into gas and liquid.

The first-pump flow path 41, the second-pump flow path 42, the radiator flow path 43, the cooler core flow path 44, the heater-core flow path 45, the coolant-to-coolant heat exchanger flow path 46, the inverter flow path 47, and the battery heat exchange flow path 48 are connected to the first switching valve 21 and the second switching valve 22.

The first and second switching valves 21 and 22 are circulation switching devices that switch the flow of the coolant (coolant circulation state). The first and second switching valves 21 and 22 are dehumidification mode switching devices that switch the dehumidification mode.

The first switching valve 21 has a first inlet 21*a* and a second inlet 21*b* as inlets for the coolant, and a first outlet 21*c*, a second outlet 21*d*, a third outlet 21*e*, a fourth outlet 21*f*, a fifth outlet 21*g*, a sixth outlet 21*h*, and a seventh outlet 21*i* as outlets for the coolant.

The second switching valve 22 has a first outlet 22*a* and a second outlet 22*b* as outlets for the coolant, and a first inlet 22*c*, a second inlet 22*d*, a third inlet 22*e*, a fourth inlet 22*f*, a fifth inlet 22*g*, a sixth inlet 22*h*, and a seventh inlet 22*i* as inlets for the coolant.

The first inlet 21*a* of the first switching valve 21 is connected to one end of the first-pump flow path 41. In other words, the first inlet 21*a* of the first switching valve 21 is connected to the coolant outlet side of the coolant cooler 14.

The second inlet 21*b* of the first switching valve 21 is connected to one end of the second-pump flow path 42. In other words, the second inlet 21*b* of the first switching valve 21 is connected to the coolant outlet side of the coolant heater 15.

The first outlet 21*c* of the first switching valve 21 is connected to one end of the radiator flow path 43. In other words, the first outlet 21*c* of the first switching valve 21 is connected to the coolant inlet side of the radiator 13.

The second outlet 21*d* of the first switching valve 21 is connected to one end of the cooler-core flow path 44. In other words, the second outlet 21*d* of the first switching valve 21 is connected to the coolant inlet side of the cooler core 16.

The third outlet 21*e* of the first switching valve 21 is connected to one end of the heater-core flow path 45. In other words, the third outlet 21*e* of the first switching valve 21 is connected to the coolant inlet side of the heater core 17.

The fourth outlet 21*f* of the first switching valve 21 is connected to one end of the coolant-to-coolant heat exchanger flow path 46. In other words, the fourth outlet 21*f* of the first switching valve 21 is connected to the coolant inlet side of the coolant-to-coolant heat exchanger 18.

The fifth outlet 21*g* of the first switching valve 21 is connected to one end of the inverter flow path 47. In other words, the fifth outlet 21*g* of the first switching valve 21 is connected to the coolant inlet side of the inverter 19.

The sixth outlet 21*h* of the first switching valve 21 is connected to one end of the battery heat exchange flow path 48. In other words, the sixth outlet 21*h* of the first switching valve 21 is connected to the coolant inlet side of the battery-temperature adjustment heat exchanger 20. The seventh outlet 21*i* of the first switching valve 21 is connected to one end of a bypass flow path 49.

The first outlet 22*a* of the second switching valve 22 is connected to the other end of the first-pump flow path 41. In other words, the first outlet 22*a* of the second switching valve 22 is connected to the coolant suction side of the first pump 11.

The second outlet 22*b* of the second switching valve 22 is connected to the other end of the second-pump flow path 42. In other words, the second outlet 22*b* of the second switching valve 22 is connected to the coolant suction side of the second pump 12.

The first inlet 22*c* of the second switching valve 22 is connected to the other end of the radiator flow path 43. In other words, the first inlet 22*c* of the second switching valve 22 is connected to the coolant outlet side of the radiator 13.

The second inlet 22*d* of the second switching valve 22 is connected to the other end of the cooler-core flow path 44. In other words, the second inlet 22*d* of the second switching valve 22 is connected to the coolant outlet side of the cooler core 16.

The third inlet 22*e* of the second switching valve 22 is connected to the other end of the heater-core flow path 45. In other words, the third inlet 22*e* of the second switching valve 22 is connected to the coolant outlet side of the heater core 17.

The fourth inlet 22*f* of the second switching valve 22 is connected to the other end of the coolant-to-coolant heat exchanger flow path 46. In other words, the fourth inlet 22*f* of the second switching valve 22 is connected to the coolant outlet side of the coolant-to-coolant heat exchanger 18.

The fifth inlet 22*g* of the second switching valve 22 is connected to the other end of the inverter flow path 47. In other words, the fifth inlet 22*g* of the second switching valve 22 is connected to the coolant outlet side of the inverter 19.

The sixth inlet 22*h* of the second switching valve 22 is connected to the other end of the battery heat exchange flow path 48. In other words, the sixth inlet 22*h* of the second switching valve 22 is connected to the coolant outlet side of the battery-temperature adjustment heat exchanger 20. The seventh inlet 22*i* of the second switching valve 22 is connected to the other end of the bypass flow path 49.

The first switching valve 21 and the second switching valve 22 can be configured to arbitrarily or selectively switch the communication states between each inlet and outlet.

Specifically, the first switching valve 21 switches among a state in which the coolant discharged from the first pump 11 flows thereinto, a state in which the coolant discharged from the second pump 12 flows thereinto, and a state in which the coolant discharged from the first pump 11 and the coolant discharged from the second pump 12 do not flow thereinto, with respect to each of the radiator 13, the cooler core 16, the heater core 17, the coolant-to-coolant heat exchanger 18, the inverter 19, the battery-temperature adjustment heat exchanger 20, and the bypass flow path 49.

The second switching valve 22 switches among a state in which the coolant flows out to the first pump 11, a state in which the coolant flows out to the second pump 12, and a state in which the coolant does not flow to the first pump 11 and the second pump 12, with respect to each of the radiator 13, the cooler core 16, the heater core 17, the coolant-to-coolant heat exchanger 18, the inverter 19, the battery-temperature adjustment heat exchanger 20, and the bypass flow path 49.

The first switching valve 21 and the second switching valve 22 are capable of adjusting their valve opening degrees. In this way, the first and second switching valves 21 and 22 can adjust the flow rates at which the coolant flows through the radiator 13, the cooler core 16, the heater core 17, the coolant-to-coolant heat exchanger 18, the inverter 19, the battery-temperature adjustment heat exchanger 20, and the bypass flow path 49.

That is, the first switching valve 21 and the second switching valve 22 are flow-rate adjustment portions that adjust the flow rate of the coolant in each of the radiator 13, the cooler core 16, the heater core 17, the coolant-to-coolant heat exchanger 18, the inverter 19, the battery-temperature adjustment heat exchanger 20, and the bypass flow path 49.

The first switching valve 21 is capable of mixing the coolant discharged from the first pump 11 and the coolant discharged from the second pump 12 at any flow-rate ratio, thereby allowing the mixed coolant to flow into the radiator 13, the cooler core 16, the heater core 17, the coolant-to-coolant heat exchanger 18, the inverter 19, the battery-temperature adjustment heat exchanger 20, and the bypass flow path 49.

That is, the first switching valve 21 and the second switching valve 22 serve as flow-rate ratio adjustment devices that adjust the flow-rate ratio of the coolant cooled by the coolant cooler 14 to that heated by the coolant heater 15, with respect to each of the radiator 13, the cooler core 16, the heater core 17, the coolant-to-coolant heat exchanger 18, the inverter 19, the battery-temperature adjustment heat exchanger 20, and the bypass flow path 49.

The first switching valve 21 and the second switching valve 22 may be integrally formed, and a valve driving source may be shared therebetween. Alternatively, the first switching valve 21 and the second switching valve 22 may be formed of a combination of a number of valves.

The cooler core 16 and the heater core 17 are accommodated in a casing 51 of an interior air-conditioning unit 50 in the vehicle air conditioner.

The casing 51 forms an air passage for ventilation air to be blown into the vehicle interior. The casing 51 is formed of resin (for example, polypropylene) with some elasticity and excellent strength. An inside/outside air switching case 52 is disposed at the most upstream side of air flow in the casing 51. The inside/outside air switching case 52 is an inside/outside air introduction portion that switches between the inside air (air in a vehicle compartment) and the outside air (air outside the vehicle compartment) to introduce the switched air.

The inside/outside air switching case 52 has an inside-air suction port 52a for introducing the inside air into the casing 51, and an outside-air suction port 52b for introducing the outside air into the casing 51. An inside/outside air switching door 53 is disposed inside the inside/outside air switching case 52.

The inside/outside air switching door 53 is an inside/outside air switching portion that switches between an inside-air introduction mode of introducing the inside air into the casing 51 and an outside-air introduction mode of introducing the outside air thereinto. In other words, the inside/outside air switching door 53 serves as an air-volume ratio changing portion for changing the ratio of the volume of inside air to that of outside air to be introduced into the casing 51. The inside/outside air switching door 53 serves as an inside/outside air ratio adjustment portion for adjusting the ratio of the volume of inside air to that of outside air to be introduced into the casing 51.

Specifically, the inside/outside air switching door 53 continuously adjusts the opening areas of the inside-air suction port 52a and the outside-air suction port 52b, thereby changing the ratio of the volume of the inside air to that of the outside air. The inside/outside air switching door 53 is driven by an electric actuator (not shown).

An interior blower (blower) 54 is disposed downstream of the air flow in the inside/outside air switching case 52. The interior blower 54 blows air (inside air and outside air) drawn via the inside/outside air switching case 52, into the vehicle interior. The interior blower 54 is an electric blower that includes a centrifugal multiblade fan (sirocco fan) to be driven by an electric motor.

The cooler core 16, the heater core 17, and an auxiliary heater 56 are disposed on the downstream side of the air flow from the interior blower 54 in the casing 51. The auxiliary heater 56 has a PTC element (positive thermistor), and is a PTC heater (electric heater) that heats the air by generating heat through supply of the electric power to the PTC element.

A heater-core bypass passage 51a is formed at the downstream side part of the air flow through the cooler core 16 within the casing 51. The heater-core bypass passage 51a is an air passage that allows the air passing through the cooler core 16 to flow without causing the air to pass through the heater core 17 and the auxiliary heater 56.

An air mix door 55 is disposed in between the cooler core 16 and the heater core 17 within the casing 51.

The air mix door 55 serves as an air-volume-ratio adjusting portion that continuously changes the ratio of the volume of the air flowing into the heater core 17 and the auxiliary heater 56 to that of the air flowing into the heater-core bypass passage 51a. The air mix door 55 is, for example, a revolving plate-shaped door, a slidable door, or the like, and driven by an electric actuator (not shown).

The temperature of blowout air to be blown into the vehicle interior is changed by the ratio of the volume of the air passing through the heater core 17 and the auxiliary heater 56 to that of the air passing through the heater-core bypass passage 51a. Thus, the air mix door 55 serves as a temperature adjustment portion adapted to adjust the temperature of the blowout air to be blown into the vehicle interior.

An air outlet 51b for blowing the ventilation air into the vehicle interior as a space to be air-conditioned is disposed on the most downstream side of the air flow in the casing 51. The air outlet 51b specifically includes a defroster air outlet, a face air outlet, and a foot air outlet.

The defroster air outlet blows the conditioned air toward the inner side of a windshield of the vehicle. The face air outlet blows the conditioned air toward the upper body of an occupant. The foot air outlet blows the conditioned air toward the feet of the occupant.

An air-outlet mode door (not shown) is disposed on the upstream side of the air flow in the air outlet 51b. The air-outlet mode door serves as an air-outlet mode switch for switching the air outlet mode. The air-outlet mode door is driven by the electric actuator (not shown).

The air-outlet modes switched by the air-outlet mode door include, for example, a face mode, a bi-level mode, a foot mode, and a foot-defroster mode.

The face mode is the air outlet mode in which the face air outlet is fully opened to blow the air from the face air outlet toward the upper body of the occupant in the vehicle compartment. The bi-level mode is the air outlet mode in which both the face air outlet and foot air outlet are opened to blow air toward the upper body and feet of the occupant in the vehicle compartment.

The foot mode is the air outlet mode in which the foot air outlet is fully opened with the defroster air outlet opened only by a small opening degree to blow the air mainly from the foot air outlet. The foot-defroster mode is the air outlet mode in which the foot air outlet and the defroster air outlet are opened by the same degree to blow the air from both the foot air outlet and the defroster air outlet.

The engine cooling circuit 60 is a coolant circulation circuit for cooling the engine 61. The engine cooling circuit 60 includes a circulation flow path 62 that allows circulation of the coolant. The circulation flow path 62 is provided with the engine 61, an engine pump 63, an engine radiator 64, and the coolant-to-coolant heat exchanger 18.

The engine pump 63 is an electric pump that draws and discharges the coolant. The engine pump 63 may be a mechanical pump driven by a power output from the engine 61.

The engine radiator 64 is a heat exchanger for heat dissipation (heat medium-to-air heat exchanger) that dissipates heat of the coolant into the outside air by exchanging heat between the coolant and the outside air.

The circulation flow path 62 is connected to a radiator bypass flow path 65. The radiator bypass flow path 65 is a flow path through which the coolant flows while bypassing the engine radiator 64.

A thermostat 66 is disposed in a connection portion between the radiator bypass flow path 65 and the circulation flow path 62. The thermostat 66 is a coolant-temperature responsive valve constructed of a mechanical mechanism that is designed to open and close a coolant flow path by displacing a valve body using a thermo wax (temperature sensing member) whose volume changes in response to the temperature.

Specifically, when the temperature of coolant exceeds a predetermined temperature (for example, 80° C. or higher), the thermostat 66 closes the radiator bypass flow path 65. When the temperature of coolant is lower than the predetermined temperature (for example, less than 80° C.), the thermostat 66 opens the radiator bypass flow path 65.

The circulation flow path 62 is connected to an engine-accessory flow path 67. The engine-accessory flow path 67 is a flow path in which the coolant flows in parallel with the coolant-to-coolant heat exchanger 18.

Engine accessories 68 are disposed in the engine-accessory flow path 67. The engine accessories 68 include an oil heat exchanger, an exhaust gas recirculation (EGR) cooler, a throttle cooler (warmer), a turbo cooler, an engine-accessory motor, and the like. The oil heat exchanger is a heat exchanger that adjusts the temperature of oil by exchanging heat between the coolant and the engine oil or transmission oil.

The EGR cooler is a heat exchanger constituting an EGR (exhaust gas recirculation) device that refluxes part of exhaust gas from the engine onto the intake side to reduce pumping loss caused by a throttle valve. Specifically, the EGR cooler is the heat exchanger that exchanges heat between recirculated gas and the coolant to thereby adjust the temperature of the recirculated gas.

The throttle cooler (warmer) is a temperature adjuster that adjusts the temperature of throttle valve components by exchanging heat between the throttle valve components and the coolant via a water jacket provided in the throttle in order to protect the throttle valve components from heat damage when a throttle valve is at a high temperature (e.g., 100° C. or higher), and to prevent the throttle valve component from freezing and causing a failure in operation when the throttle valve is at a low temperature (e.g., below zero).

The turbo cooler is a cooler that cools a turbo charger by exchanging heat between heat generated by the turbo charger and the coolant.

The engine auxiliary motor is a large-sized motor for rotating an engine belt even during stopping of the engine. The engine auxiliary motor is used to operate the compressor or water pump, which is driven by the engine belt, even when no driving force is available from the engine, or used upon start-up of the engine.

An engine reserve tank 64a is coupled to the engine radiator 64. The structure and function of the engine reserve tank 64a are the same as those of the above-mentioned reserve tank 43a.

Figure 2:
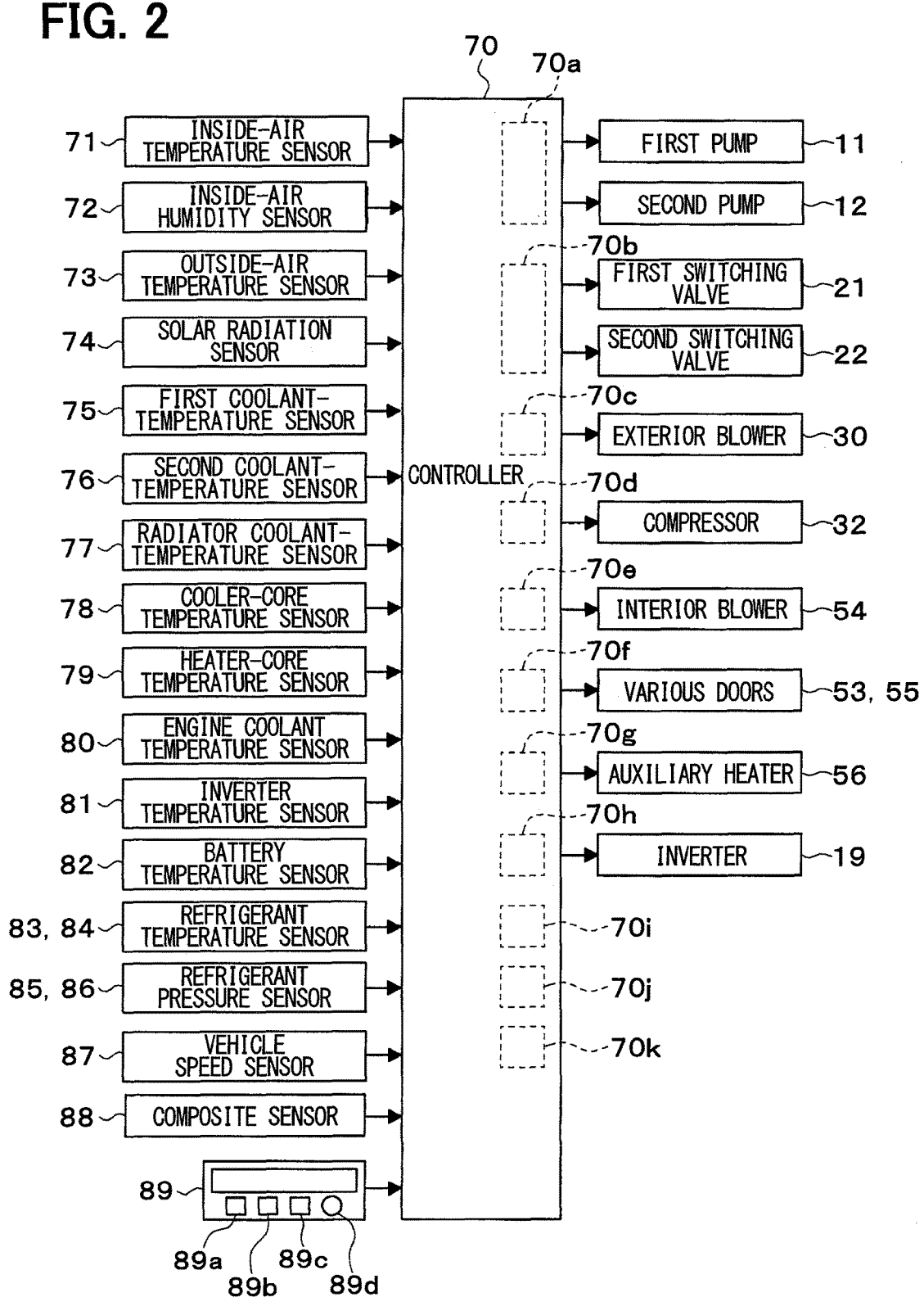
FIG. 2 is a block diagram showing an electric control unit in the vehicle thermal management system in the first embodiment.

Now, an electric controller of the vehicle thermal management system 10 will be described with reference to FIG. 2. A controller 70 is comprised of a known microcomputer, including a CPU, a ROM, and a RAM, and a peripheral circuit thereof. The controller performs various computations and processing based on air-conditioning control programs stored in the ROM to thereby control the operations of various control target devices that are connected to its output side.

The control target devices that are to be controlled by the controller 70 include the first pump 11, the second pump 12, the first switching valve 21, the second switching valve 22, the exterior blower 30, the compressor 32, the interior blower 54, the electric actuator for driving various doors (inside/outside air switching door 53, air mix door 55, air-outlet mode door, and the like) disposed in the casing 51, and the inverter 19.

Structures (hardwares and softwares) of the controller 70 that control the operations of respective control target devices, which are connected to the output side of the controller 70, serve as control units (control portions) for controlling the operations of the respective control target devices.

A structure (hardware and software) of the controller 70 that controls the operations of the first pump 11 and the second pump 12 is configured as a pump control unit 70a. The pump control unit 70a is a flow-rate control unit for controlling the flow rates of coolants flowing through the respective coolant-circulation devices.

A structure (hardware and software) of the controller 70 that controls the operations of the first switching valve 21 and the second switching valve 22 is configured as a switching control unit 70b. The switching control unit 70b also serves as a circulation switching control unit for switching the circulation state of coolant. The switching control unit 70b still also serves as a flow-rate control unit (flow-rate controller) for adjusting the flow rates of coolants flowing through the respective coolant-circulation devices.

A structure (hardware and software) of the controller 70 that controls the operation of the exterior blower 30 is configured as an exterior blower control unit 70c (outside-air blower control unit). The exterior blower control unit 70c serves as a flow-rate control unit (flow-rate control portion) that controls the flow rate of outside air flowing through the radiator 13.

A structure (hardware and software) of the controller 70 that controls the operation of the compressor 32 is configured as a compressor control unit 70d (compressor control portion). The compressor control unit 70d is a refrigerant flow-rate control unit (flow-rate control portion) that controls the flow rate of refrigerant discharged from the compressor 32.

A structure (hardware and software) of the controller 70 that controls the operation of the interior blower 54 is configured as an interior blower control unit 70e. The interior blower control unit 70e serves as a blowout-air volume control unit for controlling the volume of ventilation air to be blown into the vehicle interior.

A structure (hardware and software) of the controller 70 that controls the operations of various doors disposed inside the casing 51 (inside/outside air switching door 53, air mix door 55, air-outlet mode door, and the like) is configured as an air-conditioning switching control unit 70f. The air-conditioning switching control unit 70f is an inside/outside air switching control unit for controlling the operation of the inside/outside air switching door 53. The air-conditioning switching control unit 70f is an inside/outside air ratio control unit that controls the ratio of the volume of the inside air to that of the outside air to be introduced into the casing 51.

A structure (hardware and software) of the controller 70 that controls the operation of the auxiliary heater 56 is configured as an auxiliary heater control unit 70g (electric heater control unit).

A structure (hardware and software) of the controller 70 that controls the operation of the inverter 19 is configured as an inverter control unit 70h (heat generator control unit).

The respective control units 70a, 70b, 70c, 70d, 70e, 70f, 70g, and 70h may be formed separately from the controller 70.

Detection signals from a group of sensors are input to the input side of the controller 70. The group of sensors includes an inside-air temperature sensor 71, an inside-air humidity sensor 72, an outside-air temperature sensor 73, a solar radiation sensor 74, a first coolant-temperature sensor 75, a second coolant-temperature sensor 76, a radiator coolant-temperature sensor 77, a cooler-core temperature sensor 78, a heater-core temperature sensor 79, an engine coolant-temperature sensor 80, an inverter temperature sensor 81, a battery temperature sensor 82, refrigerant temperature sensors 83 and 84, refrigerant pressure sensors 85 and 86, a vehicle speed sensor 87, and a composite sensor 88.

The inside-air temperature sensor 71 is a detector (inside-air temperature detector) that detects the temperature of inside air (or the temperature of air in the vehicle compartment). The inside-air humidity sensor 72 is a detector (inside-air humidity detector) that detects the humidity of the inside air.

The outside-air temperature sensor 73 is a detector (outside-air temperature detector) that detects the temperature of outside air (or the temperature of air outside the vehicle compartment). The solar radiation sensor 74 is a detector (solar radiation amount detector) that detects the amount of solar radiation in the vehicle interior.

The first coolant-temperature sensor 75 is a detector (first heat-medium temperature detector) that detects the temperature of coolant (e.g., water) flowing through the first-pump flow path 41 (for example, the temperature of coolant drawn into the first pump 11).

The second coolant-temperature sensor 76 is a detector (second heat-medium temperature detector) that detects the temperature of coolant (e.g., water) flowing through the second-pump flow path 42 (for example, the temperature of coolant drawn into the second pump 12).

The radiator coolant-temperature sensor 77 is a detector (device-side heat-medium temperature detector) that detects the temperature of coolant flowing through the radiator flow path 43 (for example, the temperature of coolant flowing out of the radiator 13).

The cooler-core temperature sensor 78 is a detector (cooler-core temperature detector) for detecting the surface temperature of the cooler core 16. The cooler-core temperature sensor 78 is, for example, a fin thermistor for detecting the temperature of a heat exchange fin in the cooler core 16, a water-temperature sensor for detecting the temperature of coolant flowing through the cooler core 16, or the like.

The heater-core temperature sensor 79 is a detector (heater-core temperature detector) that detects the surface temperature of the heater core 17. The heater-core temperature sensor 79 is, for example, a fin thermistor for detecting the temperature of a heat exchange fin in the heater core 17, a water-temperature sensor for detecting the temperature of coolant flowing through the heater core 17, or the like.

The engine coolant-temperature sensor 80 is a detector (engine heat-medium temperature detector) that detects the temperature of coolant circulating through the engine cooling circuit 60 (for example, the temperature of coolant flowing through the inside of the engine 61).

The inverter temperature sensor 81 is a detector (device-side heat-medium temperature detector) that detects the temperature of coolant flowing through the inverter flow path 47 (for example, the temperature of coolant flowing out of the inverter 19).

The battery temperature sensor 82 is a detector (device-side heat-medium temperature detector) that detects the temperature of coolant flowing through the battery heat exchange flow path 48 (for example, the temperature of coolant flowing into the battery-temperature adjustment heat exchanger 20). The battery temperature sensor 82 may be a detector (battery typical temperature detector) that detects the temperature of a specific part (battery typical temperature) in a battery pack with fluctuations in temperature.

Refrigerant temperature sensors 83 and 84 are the discharge-side refrigerant temperature sensor 83 that detects the temperature of refrigerant discharged from the compressor 32, and the suction-side refrigerant temperature sensor 84 that detects the temperature of refrigerant drawn into the compressor 32.

Refrigerant pressure sensors 85 and 86 are the discharge-side refrigerant pressure sensor 85 that detects the pressure of refrigerant discharged from the compressor 32, and the suction-side refrigerant pressure sensor 86 that detects the pressure of refrigerant drawn into the compressor 32.

The vehicle speed sensor 87 is a detector (vehicle-speed detector) that detects the traveling speed of the vehicle. The composite sensor 88 is a detector that detects the surface temperature of a windshield, the temperature of inside air in the vicinity of the windshield, and the humidity of the inside air in the vicinity of the windshield. For example, the composite sensor 88 is installed at the inner surface of the windshield on the back side of a room mirror.

The controller 70 calculates the window fogging index RHW, which is an index for the risk degree of fogging on the windshield, based on the detection signal or the like from the composite sensor 88.

Specifically, the controller 70 calculates a saturated vapor pressure Pr of the inside air in the vicinity of the windshield and a saturated vapor pressure Pg thereof at its surface temperature of the windshield based on the surface temperature of the windshield, the temperature of inside air in the vicinity of the windshield, and the humidity of the inside air in the vicinity of the windshield. Then, the window fogging index RHW is calculated on the basis of the following formula F1.

$$RHW = Pr/Pg + \alpha \qquad \text{F1}$$

In the formula F1, α is a safety factor calculated from the temperature of outside air, the amount of solar radiation, the vehicle speed, and the like.

A structure (hardware and software) of the controller 70 that calculates the window fogging index RHW is configured as a window-fogging-index calculating portion 70i. The window-fogging-index calculating portion 70i may be formed separately from the controller 70.

The controller 70 detects failure by determining the presence or absence of the failure of the respective control target devices (first pump 11, second pump 12, compressor 32, and the like) and the respective sensors, based on detection signals from a group of sensors.

A structure (hardware and software) of the controller 70 that detects the failure of the first pump 11 is configured as a pump failure detecting portion 70j. A structure (hardware and software) of the controller 70 that detects the failure of the compressor 32 is configured as a compressor failure detecting portion 70k. The respective failure detecting portions 70j and 70k may be formed separately from the controller 70.

An operation panel 89 is provided with various air-conditioning operation switches. Operation signals from the operation switches are input to the input side of the controller 70. For example, the operation panel 89 is disposed near the dashboard at the front of the vehicle compartment.

Various air-conditioning operation switches provided on the operation panel 89 include a defroster switch 89a, an air conditioner switch 89b, an automatic switch, an inside/outside air selector switch 89c, an vehicle-interior temperature setting switch 89d, an air volume setting switch, an air-conditioning stopping switch, a power-saving cooling mode switch, a power-saving dehumidification switch, and the like.

Each switch may be a push switch that brings electric contacts into conduction by being mechanically pushed, or a touch screen that reacts in response to contact with a predetermined region on an electrostatic panel.

The defroster switch 89a is a switch for setting or resetting a defroster mode. The defroster mode is an air outlet mode for preventing fogging on a windshield by blowing the conditioned air toward the inner surface of the windshield from a defroster air outlet of the interior air-conditioning unit 50, or for removing fog from a window when the window is fogged.

If the outside-air temperature is, for example, 10° C. or higher when the defroster mode is selected by the user's operation, a compressor-on mode (first dehumidification mode) operation is performed. If the outside-air temperature is, for example, less than 10° C. and 5° C. below zero or higher, and the temperature of coolant flowing through the heater core 17 exceeds, for example, 60° C. when the defroster mode is selected by the user's operation, a compressor-off mode (second dehumidification mode) operation is performed.

In the compressor-on mode, the compressor 32 is operated (turned on) while controlling the operations of the first switching valve 21 and the second switching valve 22 in such a manner as to allow the coolant to circulate between the coolant cooler 14 and the cooler core 16.

Thus, when the vehicle-interior ventilation air can be determined not to be dehumidified because of a high outside-air temperature even though the coolant cooled by the radiator 13 flows though the cooler core 16, the coolant cooled by the coolant cooler 14 in the refrigeration cycle 31 is allowed to flow through the cooler core 16, enabling dehumidification of the ventilation air in the vehicle interior, thereby preventing fogging on the windshield.

In the compressor-off mode, the compressor 32 is stopped (turned off) while controlling the operations of the first switching valve 21 and the second switching valve 22 in such a manner as to allow the coolant to circulate between the radiator 13 and the cooler core 16.

Thus, the vehicle-interior ventilation air can be dehumidified by allowing the coolant cooled by the radiator 13 to flow through the cooler core 16 under a low outside-air temperature, thereby preventing fogging on the windshield. Since the compressor 32 is stopped in the compressor-off mode, the power required to prevent fogging on the windshield can be significantly reduced, compared with in the compressor-on mode.

The air conditioner switch 89b is a switch for switching between operating and stopping (on and off) of air cooling or dehumidification. The air volume setting switch is a switch for setting the volume of air blown from the interior blower 54. The automatic switch is a switch for setting or resetting automatic control of the air conditioning.

The inside/outside air selector switch 89c is a switch that switches between the inside-air introduction mode and the outside-air introduction mode. The inside/outside air selector switch 89c is an operation portion that outputs a command for setting the rate of the inside air introduced into the casing 51 to a predetermined rate or more upon being operated by an occupant.

The vehicle-interior temperature setting switch 89d is a target temperature setting portion for setting a target vehicle interior temperature by the occupant's operation. The air-conditioning stop switch is a switch that stops the air conditioning.

The power-saving cooling mode switch and the power-saving dehumidification mode switch are operation portions for outputting commands to suppress the power consumption of the compressor 32 during the cooling operation and the dehumidification operation. For example, once the occupant operates the switches during the compressor-on mode operation, a command is output to switch to the compressor-off mode operation.

The controller 70 determines an air-conditioning mode based on the outside-air temperature and the target blowout temperature TAO of the air blown into the vehicle interior. The target blowout temperature TAO is a value determined so that the inside-air temperature Tr quickly approaches a target temperature Tset desired by the occupant and calculated by the following formula F2.

$$TAO = Kset \times Tset - Kr \times Tr - Kam \times Tam - Ks \times Ts + C \quad \text{F2}$$

In this formula, Tset is a target vehicle interior temperature set by the vehicle-interior temperature setting switch 89d, Tr is an inside-air temperature detected by the inside-air temperature sensor 71, Tam is an outside-air temperature detected by the outside-air temperature sensor 73, and Ts is a solar radiation amount detected by the solar radiation sensor 74. Kset, Kr, Kam, and Ks are control gains, and C is a constant for correction.

For example, the controller 70 determines the air-conditioning mode to be a cooling mode when the target blowout temperature TAO is lower than the outside-air temperature, whereas the controller 70 determines the air-conditioning mode to be a heating mode when the target blowout temperature TAO is higher than the outside-air temperature.

A structure (hardware and software) of the controller 70 that determines the air-conditioning mode is an air-conditioning mode determination portion (air-conditioning mode determining portion). The air-conditioning mode determination portion may be separately formed from the controller 70.

Next, the operation of the above-mentioned structure will be described. The controller 70 controls the operations of the first pump 11, the second pump 12, the compressor 32, the first switching valve 21, the second switching valve 22, and the like, thereby switching among various operation modes.

For example, a low-temperature side coolant circuit (low-temperature side heat-medium circuit) is formed that allows the coolant drawn into and discharged from the first pump 11 to circulate between the coolant cooler 14 and at least one device of the radiator 13, the cooler core 16, the heater core 17, the coolant-to-coolant heat exchanger 18, the inverter 19, and the battery-temperature adjustment heat exchanger 20. Furthermore, a high-temperature side coolant circuit (high-temperature side heat-medium circuit) is formed that allows the coolant drawn into and discharged from the second pump 12 to circulate between the coolant heater 15 and at least one device of the radiator 13, the cooler core 16, the heater core 17, the coolant-to-coolant heat exchanger 18, the inverter 19, and the battery-temperature adjustment heat exchanger 20.

Each of the radiator 13, the cooler core 16, the heater core 17, the coolant-to-coolant heat exchanger 18, the inverter 19, and the battery-temperature adjustment heat exchanger 20 is switched between a state of connection to the low-temperature side coolant circuit and a state of connect to the high-temperature side coolant circuit. Thus, the radiator 13, the cooler core 16, the heater core 17, the coolant-to-coolant heat exchanger 18, the inverter 19, and the battery-temperature adjustment heat exchanger 20 can be adjusted to their appropriate temperatures depending on the situation.

When the radiator 13 is connected to the low-temperature side coolant circuit, the refrigeration cycle 31 can perform a heat-pump operation. That is, in the low-temperature side coolant circuit, the coolant cooled by the coolant cooler 14 flows through the radiator 13, allowing the coolant to absorb heat from the outside air at the radiator 13.

Then, the coolant having absorbed heat from the outside air at the radiator 13 exchanges heat with the refrigerant in the refrigeration cycle 31 to dissipate heat at the coolant cooler 14. Thus, in the coolant cooler 14, the refrigerant in the refrigeration cycle 31 absorbs heat from outside air via the coolant.

The refrigerant having absorbed heat from the outside air at the coolant cooler 14 exchanges heat with the coolant in the high-temperature side coolant circuit at the coolant heater 15 to thereby dissipating the heat therefrom. Therefore, the heat-pump operation for pumping up the heat from the outside air can be achieved.

When the radiator 13 is connected to the high-temperature side coolant circuit, the coolant heated by the coolant heater 15 flows through the radiator 13, allowing the coolant to dissipate heat into the outside air at the radiator 13.

When the cooler core 16 is connected to the low-temperature side coolant circuit, the coolant cooled by the coolant cooler 14 flows through the cooler core 16, allowing the ventilation air passing into the vehicle interior to be cooled and dehumidified by the cooler core 16. That is, the vehicle interior can be cooled and dehumidified.

When the heater core 17 is connected to the high-temperature side coolant circuit, the coolant heated by the coolant heater 15 flows through the heater core 17, allowing the ventilation air passing into the vehicle interior to be heated by the heater core 17. That is, the vehicle interior can be heated.

When the coolant-to-coolant heat exchanger 18 is connected to the low-temperature side coolant circuit, the coolant cooled by the coolant cooler 14 flows through the coolant-to-coolant heat exchanger 18, thereby enabling cooling of the engine coolant. In other words, the coolant in the low-temperature side coolant circuit can absorb heat from the engine coolant at the coolant-to-coolant heat exchanger 18, which can achieve the heat-pump operation that pumps up the waste heat from the engine 61.

When the coolant-to-coolant heat exchanger 18 is connected to the high-temperature side coolant circuit, the coolant heated by the coolant heater 15 flows through the coolant-to-coolant heat exchanger 18, so that the engine coolant can be heated. Thus, the engine 61 can be heated (warmed up).

When the inverter 19 is connected to the low-temperature side coolant circuit, the coolant cooled by the coolant cooler 14 flows through the inverter 19, thereby enabling cooling of the inverter 19. In other words, the heat pump operation of pumping up the waste heat from the inverter 19 can be achieved.

When the inverter 19 is connected to the high-temperature side coolant circuit, the coolant heated by the coolant heater 15 flows through the inverter 19, thereby enabling heating (warming up) of the inverter 19.

When the battery-temperature adjustment heat exchanger 20 is connected to the low-temperature side coolant circuit, the coolant cooled by the coolant cooler 14 flows through the battery-temperature adjustment heat exchanger 20, thereby enabling cooling of the battery. In other words, the heat pump operation of pumping up the waste heat from the battery can be achieved.

When the battery-temperature adjustment heat exchanger 20 is connected to the high-temperature side coolant circuit, the coolant heated by the coolant heater 15 flows through the battery-temperature adjustment heat exchanger 20, thereby enabling heating (warming up) of the battery.

Figure 3:
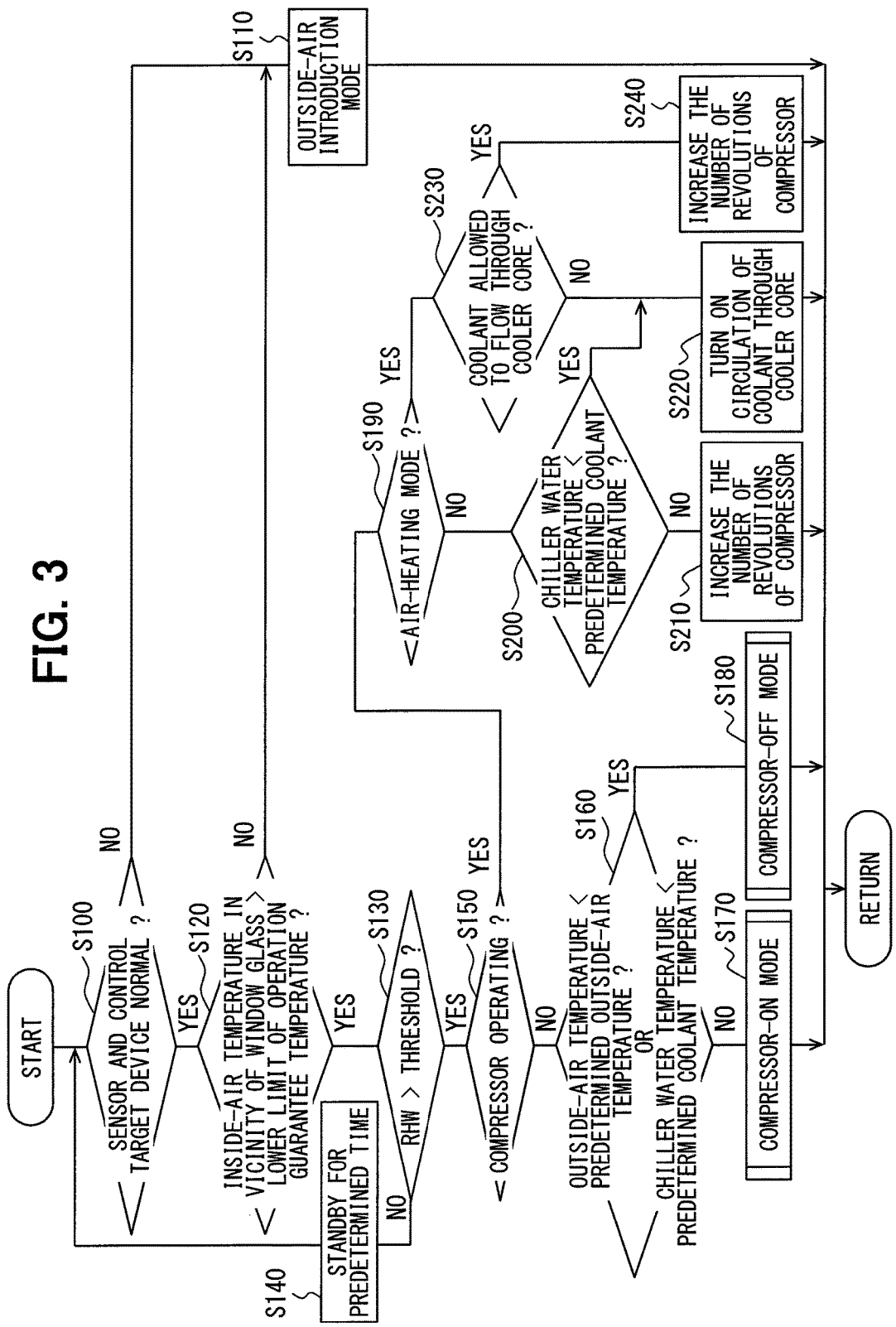
FIG. 3 is a flowchart showing control processing executed by a controller in the first embodiment.

When the defroster mode is set by the defroster switch 89a, or when automatic control of air conditioning is set by the automatic switch, the controller 70 executes the control processing to prevent fogging on the window glass as shown in the flowchart of FIG. 3.

In step S100, it is determined whether the respective control target devices and the respective sensors are normal or not (are out of order or not). For example, it is determined whether the sensor required to calculate the window fogging index RHW, the component of the refrigeration cycle 31 (compressor 32 and the like), and the first pump 11 and the second pump 12 function normally.

When each control target device or each sensor is determined not to be normal, the operation proceeds to step S110, in which the operation of the inside/outside air switching door 53 is controlled to switch to the outside-air introduction mode. Thus, even if the failure of each control target device or each sensor makes it impossible to prevent the fogging of a window by means of dehumidification, the outside air having the same or lower temperature than that of the windshield can be introduced into the vehicle interior to render a dew point temperature of the inside air in the vicinity of the windshield equal to or lower than the temperature of the windshield, thereby preventing the window fogging.

On the other hand, when the respective control target devices and respective sensors are determined to function normally, the operation proceeds to step S120, in which it is determined whether or not the temperature of inside air in the vicinity of the windshield detected by the composite sensor 88 exceeds the lower limit of operation guarantee temperature of the composite sensor 88.

When the temperature of the inside air in the vicinity of the windshield is determined not to exceed the lower limit of operation guarantee temperature of the composite sensor 88 (for example, −30° C.), the operation proceeds to step S110, in which the inside/outside air switching case 52 is switched to the outside-air introduction mode. Thus, when the composite sensor 88 is more likely to be abnormal, the outside air having the same or lower temperature than that of the windshield is introduced into the vehicle interior, thereby enabling prevention of window fogging.

On the other hand, when the temperature of inside air in the vicinity of the windshield is determined to exceed the lower limit of operation guarantee temperature of the composite sensor 88, the operation proceeds to step S130, in which it is determined whether or not the window fogging index RHW exceeds a threshold.

Figure 4:
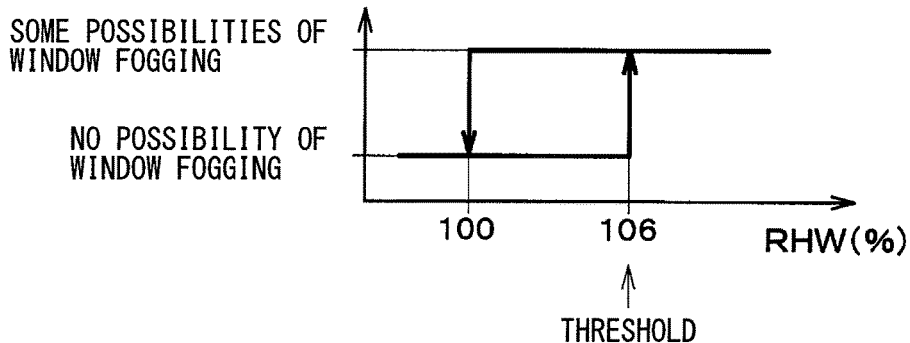
FIG. 4 is a graph for explaining a threshold of a window-fogging index RHW in the flowchart of FIG. 3.

As shown in FIG. 4, the threshold in step S130 is set to a value at which the risk of window fogging can be determined to be incurred (in the example shown in FIG. 4, 106%).

When the window fogging index RHW does not exceed the threshold, that is, when the risk of window fogging can be determined not to be incurred, the thermal management system is on standby for a predetermined time in step S140. Thereafter, the operation returns to step S100.

On the other hand, when the window fogging index RHW exceeds the threshold, that is, when the risk of window fogging can be determined to be incurred, the operation proceeds to step S150.

In step S150, it is determined whether the compressor 32 is operating or not. That is, it is determined whether the refrigeration cycle 31 is used or not for the purpose other than the prevention of fogging.

When the compressor 32 is determined not to be operating, the operation proceeds to step S160, in which it is determined whether the outside-air temperature is lower than a predetermined outside-air temperature, or whether the temperature (chiller water temperature) of coolant in the coolant cooler 14 is below a predetermined coolant temperature. For example, the temperature of coolant in the coolant cooler 14 is estimated from the temperature of coolant detected by the first coolant-temperature sensor 75 (the temperature of coolant flowing through the first-pump flow path 41).

The predetermined outside-air temperature in step S160 is a value obtained by subtracting a value determined by considering the safety factor, from the dew-point temperature of outside air in the vicinity of the windshield. The value determined by considering the safety factor is calculated by adding together an increase (estimated value) in temperature of the coolant in the flow path (radiator flow path 43) where the radiator 13 is disposed, a value determined by considering an error of each sensor, an increase in temperature due to a temperature efficiency of the radiator 13, and an increase in temperature due to a temperature efficiency of the cooler core 16.

The predetermined outside-air temperature in step S160 may be a preset value (e.g., 5° C.) previously stored in the controller. The predetermined outside-air temperature in step S160 has only to be a temperature in connection with the dew-point temperature of ventilation air to flow into the cooler core 16.

The predetermined coolant temperature in step S160 is a value obtained by subtracting a value determined by considering the safety factor, from the dew-point temperature of inside air in the vicinity of the windshield. The value determined by considering the safety factor is calculated by adding together an increase (estimated value) in temperature of the coolant in the flow path (first-pump flow path 41) where the coolant cooler 14 is disposed, a value determined by considering an error of each sensor, and an increase in temperature due to a temperature efficiency of the cooler core 16.

The predetermined coolant temperature in step S160 may be a preset value (e.g., 5° C.) previously stored in the controller.

When the outside-air temperature is below the predetermined outside-air temperature, or when the temperature of coolant (chiller water temperature) in the coolant cooler 14 is below the predetermined coolant temperature, it can be determined that the coolant cooled by the radiator 13 is allowed to flow through the cooler core 16, thereby enabling dehumidification of the ventilation air in the vehicle interior.

When it is determined in step S160 that the outside-air temperature is not below the predetermined outside-air temperature and that the temperature of coolant (chiller water temperature) in the coolant cooler 14 is not below the predetermined coolant temperature, the operation proceeds to step S170, in which the compressor-on mode (first dehumidification mode) is selected.

In the compressor-on mode, the compressor 32 is operated (turned on) while controlling the operations of the first switching valve 21 and the second switching valve 22 in such a manner as to allow the coolant to circulate between the coolant cooler 14 and the cooler core 16.

Thus, when the vehicle-interior ventilation air can be determined not to be dehumidified because of a high outside-air temperature even though the coolant cooled by the radiator 13 flows though the cooler core 16, the coolant cooled by the coolant cooler 14 in the refrigeration cycle 31 is allowed to flow through the cooler core 16, enabling dehumidification of the ventilation air in the vehicle interior, thereby preventing fogging on the windshield.

When it is determined in step S160 that the outside-air temperature is below the predetermined outside-air temperature or that the temperature of coolant (chiller water temperature) in the coolant cooler 14 is below the predetermined coolant temperature, the operation proceeds to step S180, in which the compressor-off mode (second dehumidification mode) is selected.

In the compressor-off mode, the compressor 32 is stopped (turned off) while controlling the operations of the first switching valve 21 and the second switching valve 22 in such a manner as to allow the coolant to circulate between the radiator 13 and the cooler core 16.

Thus, the vehicle-interior ventilation air can be dehumidified by allowing the coolant cooled by the radiator 13 to flow through the cooler core 16 under a low outside-air temperature, thereby preventing fogging on the windshield. Since the compressor 32 is stopped in the compressor-off mode, the power required to prevent fogging on the windshield can be significantly reduced, compared with in the compressor-on mode.

When the compressor 32 is determined to be operating in step S150, the operation proceeds to step S190, in which it is determined whether the air-conditioning mode is a heating mode or not.

When the air-conditioning mode is determined not to be the heating mode, the operation proceeds to step S200, in which it is determined whether the temperature of coolant (chiller water temperature) in the coolant cooler 14 is below a predetermined coolant temperature or not. The predetermined coolant temperature in step S200 is substantially the same as that in step S160.

When the temperature of coolant in the coolant cooler 14 (chiller water temperature) is determined not to be below the predetermined coolant temperature, the number of revolution of the compressor 32 is increased in step S210, and then the operation returns to step S100.

Thus, when the cooling capacity (dehumidifying capacity) of the coolant cooler 14 is determined to be insufficient because the refrigeration cycle 31 is used for the purpose other than the prevention of fogging, the cooling capacity (dehumidifying capacity) of the coolant cooler 14 can be increased.

On the other hand, when the temperature of coolant in the coolant cooler 14 (coolant-cooler coolant temperature) is determined to be below a predetermined coolant temperature, the operation proceeds to step S220.

In step S220, after controlling the operations of the first switching valve 21 and the second switching valve 22 to allow the coolant cooled by the coolant cooler 14 to flow through the cooler core 16, the operation returns to step S100.

Thus, the coolant cooled by the coolant cooler 14 in the refrigeration cycle 31 is allowed to flow through the cooler core 16, thereby enabling dehumidification of the ventilation air in the vehicle interior to prevent the fogging of the windshield.

When the air-conditioning mode is determined to be the heating mode in step S190, the operation proceeds to step S230, in which it is determined whether the coolant cooled by the coolant cooler 14 flows through the cooler core 16 or not.

In this embodiment, when the air conditioner switch 89b is turned on, the operations of the first and second switching valves 21 and 22 are controlled to allow the coolant cooled by the coolant cooler 14 to flow through the cooler core 16.

When the coolant cooled by the coolant cooler 14 is determined not to flow through the cooler core 16, the operations of the first and second switching valves 21 and 22 are controlled to allow the coolant cooled by the coolant cooler 14 to flow through the cooler core 16. Thus, the coolant cooled by the coolant cooler 14 in the refrigeration cycle 31 is allowed to flow through the cooler core 16, thereby enabling dehumidification of the ventilation air in the vehicle interior to prevent the fogging of the windshield.

On the other hand, when the coolant cooled by the coolant cooler 14 is determined to flow through the cooler core 16, the number of revolutions of the compressor 32 is increased in step S210, and then the operation returns to step S100.

Thus, when the cooling capacity (dehumidifying capacity) of the coolant cooler 14 is determined to be insufficient because the refrigeration cycle 32 is used for the purpose other than the prevention of fogging, the cooling capacity (dehumidifying capacity) of the coolant cooler 14 can be increased.

When the number of revolutions of the compressor 32 exceeds a predetermined value, or when the compressor 32 is operating at the maximum allowable number of revolutions, the volume of air from the interior blower 54 is decreased without increasing the number of revolutions of the compressor 32. Thus, even when the cooling capacity (dehumidification capacity) is lacking, the temperature in connection with the surface temperature of the cooler core 16 is kept lower than the dew-point temperature of the ventilation air, thereby enabling at least the minimum dehumidification that can prevent the window fogging even if the cooling capacity is insufficient.

Figure 5:
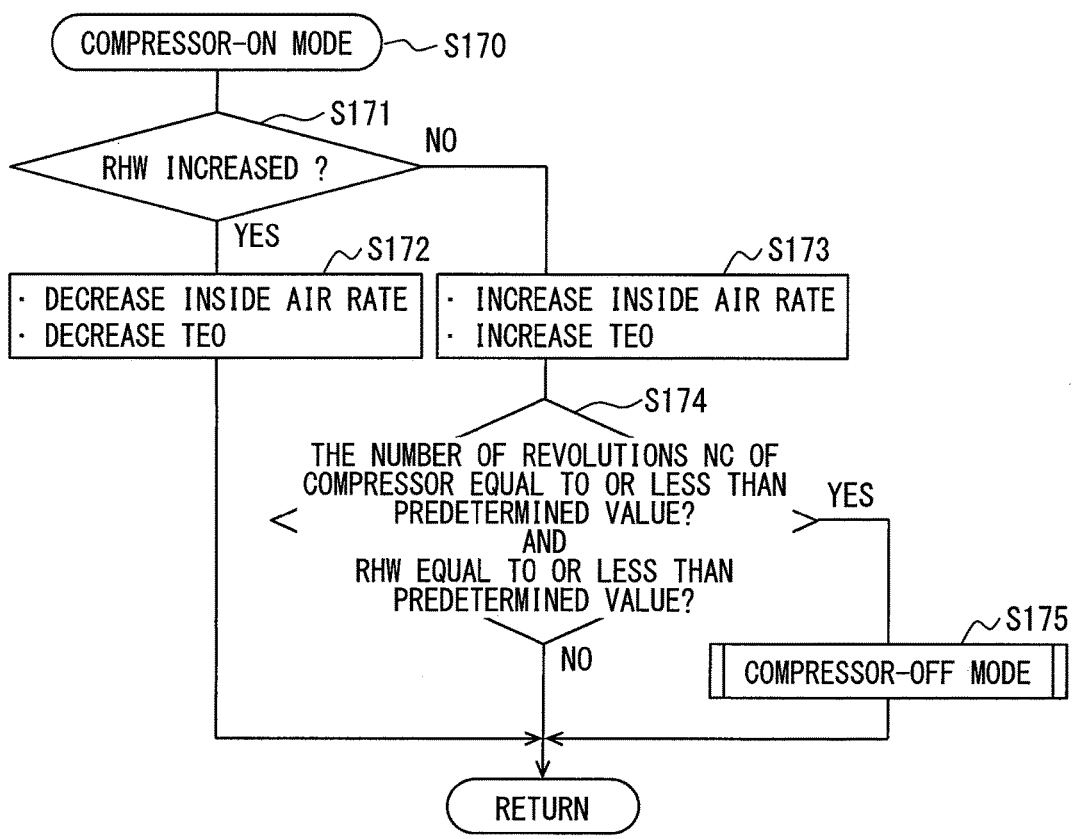
FIG. 5 is a flowchart showing control processing in a compressor-on mode of the first embodiment.

FIG. 5 is a flowchart showing specific control processing in the compressor-on mode at step S170. In step S171, it is determined whether the window fogging index RHW is increased or not. When the window fogging index RHW is determined to increase, the operation proceeds to step S172, in which the rate of the inside air is decreased, and the target coolant-cooler temperature TEO is decreased.

The inside air rate is the air-volume rate of the inside air in a combination of the inside air and outside air introduced into the casing 51 through the inside/outside air switching case 52. The target coolant-cooler temperature TEO is a target temperature of coolant cooled by the coolant cooler 14.

As the inside air rate is decreased, the rate of the outside air to be introduced into the vehicle interior is increased, resulting in a reduced window fogging index RHW.

In the compressor-on mode, the controller 70 controls the refrigerant discharge capacity (the number of revolutions) of the compressor 32 such that the temperature of coolant cooled by the coolant cooler 14 approaches the target coolant-cooler temperature TEO.

Thus, as the target coolant-cooler temperature TEO is decreased, the refrigerant discharge capacity (the number of revolutions) of the compressor 32 is increased, leading to a decrease in the temperature of coolant cooled by the coolant cooler 14. As a result, the cooler core 16 enhances its cooling and dehumidifying capacities for ventilation air, thus decreasing the window fogging index RHW.

When the window fogging index RHW is determined not to increase in step S171, the operation proceeds to step S173, in which the inside air rate is increased, and the target coolant-cooler temperature TEO is increased. Then, the operation proceeds to step S174.

As the inside air rate is increased, the rate of the outside air to be introduced into the vehicle interior is decreased, resulting in an increase in window fogging index RHW.

As the target coolant-cooler temperature TEO is decreased, the refrigerant discharge capacity (the number of revolutions) of the compressor 32 is reduced, leading to an increase in temperature of the coolant cooled by the coolant cooler 14. As a result, the cooler core 16 reduces its cooling and dehumidifying capacities for ventilation air, thus increasing the window fogging index RHW.

In step S174, it is determined whether or not the number of revolutions of the compressor 32 is equal to or less than a predetermined number of revolutions, and the window fogging index RHW is equal to or less than a predetermined value.

When it is determined that the number of revolutions of the compressor 32 is equal to or less than the predetermined number of revolutions, and that the window fogging index RHW is equal to or less than the predetermined value, as window fogging can still be prevented even in the compressor-off mode, the operation proceeds to step S175, in which the thermal management system is transferred to the compressor-off mode.

Figure 6:
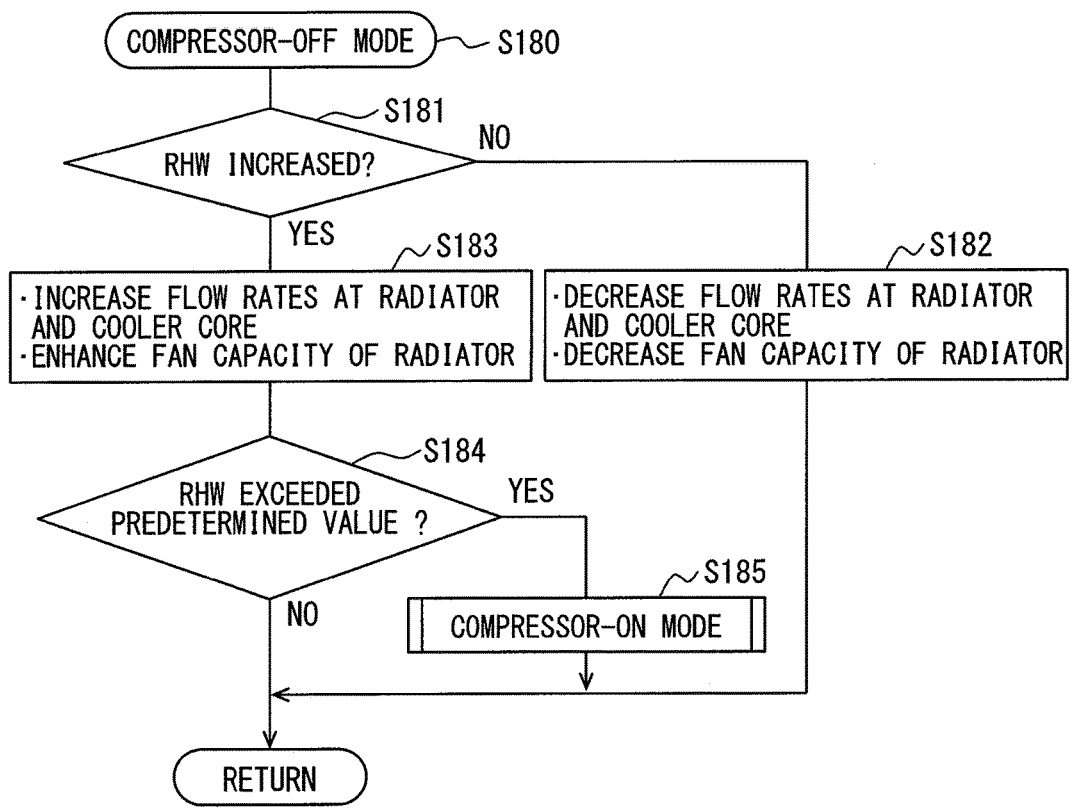
FIG. 6 is a flowchart showing control processing in a compressor-off mode of the first embodiment.

FIG. 6 is a flowchart showing specific control processing executed in the compress-off mode. In step S181, it is determined whether the window fogging index RHW increases or not. When the window fogging index RHW is determined not to increase, the operation proceeds to step S182, in which the flow rate of outside air flowing through the radiator 13 is decreased while decreasing the flow rate of coolant flowing through the radiator 13 as well as the flow rate of coolant flowing through the cooler core 16.

Thus, the cooling capacity of the radiator 13 for the coolant is reduced, and the cooling and dehumidifying capacity of the cooler core 16 for the ventilation air is also reduced, resulting in an increase in window fogging index RHW.

On the other hand, when the window fogging index RHW is determined to increase in step S181, the operation proceeds to step S183, in which the flow rate of outside air flowing through the radiator 13 is increased while increasing the flow rate of coolant flowing through the radiator 13 as well as the flow rate of coolant flowing through the cooler core 16. Then, the operation proceeds to step S184.

Thus, the cooling capacity of the radiator 13 for the coolant is increased, and the cooling and dehumidifying capacity of the cooler core 16 for the ventilation air is also increased, resulting in a decrease in window fogging index RHW.

In step S184, it is determined whether the window fogging index RHW exceeds a predetermined value or not. When the window fogging index RHW exceeds the predetermined value, it is determined that the compressor-off mode cannot prevent the window fogging. Then, the operation proceeds to step S185, in which the thermal management system is transferred to the compressor-on mode.

As the condition for switching from the compressor-off mode to the compressor-on mode, for example, any one of the following conditions (1) to (11) may be used:

(1) when the outside-air temperature is equal to or higher than the predetermined outside-air temperature (for example, 5° C.), in which the predetermined outside-air temperature is a preset value previously stored in the controller 70, and the predetermined outside-air temperature is a temperature in connection with the dew-point temperature of ventilation air flowing into the cooler core 16;

(2) when the outside-air temperature Tam exceeds a value obtained by subtracting a safety factor β from a target temperature TCO of the cooler core 16 (Tam>TCO−β);

(3) when the surface temperature TC of the cooler core 16 exceeds the target temperature TCO of the cooler core 16;

(4) when the flow rate of coolant flowing through the radiator 13 is equal to or more than a predetermined flow rate, the blowing capacity (number of revolutions) of the exterior blower 30 is equal to or more than a predetermined capacity, and the surface temperature TC of the cooler core 16 exceeds the target temperature TCO of the cooler core 16;

(5) when the flow rate of coolant flowing through the cooler core 16 is equal to or more than a predetermined flow rate, the blowing capacity (number of revolutions) of the exterior blower 30 is equal to or more than the predetermined capacity, and the surface temperature TC of the cooler core 16 exceeds the target temperature TCO of the cooler core 16;

(6) when the temperature of coolant flowing through the cooler core 16 exceeds the temperature in connection with the surface temperature TC of the cooler core 16;

(7) when the window fogging index RHW exceeds the predetermined value;

(8) when a device (such as the composite sensor 88) for use in calculating the window fogging index RHW is determined or estimated to be out of order;

(9) when the compressor 32 is operating to cool a temperature-adjustment target device (inverter 19, battery-temperature adjustment heat exchanger 20, etc.,) other than the cooler core 16;

(10) when the compressor 32 is operating to cause the refrigeration cycle 31 to perform the heat-pump operation; and

(11) when a request for heating (heating load) exceeds a predetermined value (for example, when the target blowout temperature TAO exceeds 10° C.), and a heating heat source needs to be made by the compressor 32.

Alternatively, as the condition for switching from the compressor-on mode to the compressor-off mode, for example, any one of conditions obtained by reversing the above-mentioned conditions (1) to (11) may be used.

Here, an example of control of the surface temperature TC of the cooler core 16 will be described. The controller 70 controls at least one of the flow rate of coolant flowing through the radiator 13, the flow rate of outside air flowing through the radiator 13, and the flow rate of coolant flowing through the cooler core 16 such that the surface temperature TC of the cooler core 16 approaches the target surface temperature TCO.

Specifically, when the surface temperature TC of the cooler core 16 exceeds the target surface temperature TCO, the operations of the first and second switching valves 21 and 22 are controlled such that the opening degree of the radiator flow path 43 decreases by a predetermined amount. Thus, the flow rate of coolant flowing through the radiator 13 is decreased to thereby reduce the heat exchange capacity of the radiator 13, resulting in a decrease in surface temperature TC of the cooler core 16.

On the other hand, when the surface temperature TC of the cooler core 16 is below the target surface temperature TCO, the operations of the first and second switching valves 21 and 22 are controlled such that the opening degree of the radiator flow path 43 increases by a predetermined amount. Thus, the flow rate of coolant flowing through the radiator 13 is increased to thereby enhance the heat exchange capacity of the radiator 13, resulting in an increase in surface temperature TC of the cooler core 16.

Specifically, when the surface temperature TC of the cooler core 16 exceeds the target surface temperature TCO, the blowing capacity (number of revolutions) of the exterior blower 30 is reduced by a predetermined amount. Thus, the flow rate of outside air flowing through the radiator 13 is decreased to thereby reduce the heat exchange capacity of the radiator 13, resulting in a decrease in surface temperature TC of the cooler core 16.

On the other hand, when the surface temperature TC of the cooler core 16 is below the target surface temperature TCO, the blowing capacity (number of revolutions) of the exterior blower 30 is enhanced by a predetermined amount. Thus, the flow rate of the outside air flowing through the radiator 13 is increased to thereby increase the heat exchange capacity of the radiator 13, resulting in an increase in surface temperature TC of the cooler core 16.

Specifically, when the surface temperature TC of the cooler core 16 exceeds the target surface temperature TCO, the operations of the first and second switching valves 21 and 22 are controlled such that the opening degree of the cooler core flow path 44 increases by a predetermined amount. Thus, the flow rate of the coolant flowing through the cooler core 16 is increased to thereby decrease the surface temperature TC of the cooler core 16.

On the other hand, when the surface temperature TC of the cooler core 16 is below the target surface temperature TCO, the operations of the first and second switching valves 21 and 22 are controlled such that the opening degree of the cooler core flow path 44 decreases by a predetermined amount. Thus, the flow rate of the coolant flowing through the cooler core 16 is decreased to thereby increase the surface temperature TC of the cooler core 16.

In this way, the surface temperature TC of the cooler core 16 is controlled to approach the target surface temperature TCO, thereby enabling prevention of the occurrence of the frost (frost formation) due to freezing of condensed water attached on the surface of the cooler core 16, while appropriately adjusting the amount of dehumidification at the cooler core 16.

The controller 70 may control at least one of the flow rate of coolant flowing through the radiator 13, the flow rate of outside air flowing through the radiator 13, and the flow rate of coolant flowing through the cooler core 16 in such a manner that various temperatures (for example, the temperature of ventilation air flowing out of the cooler core 16) in connection with the surface temperature TC of the cooler core 16 approaches the target surface temperature TCO.

Now, a description will be given of examples of setting the target temperatures TCO of the cooler core 16 in the compressor-on mode and the compressor-off mode. For example, the controller 70 sets the target temperature TCO for the cooler core 16 such that the humidity of the blown air becomes a humidity that does not cause window fogging, and that the surface temperature TC of the cooler core 16 is prevented from exceeding the dew-point temperature and generating an odor.

The target temperature TCO of the cooler core 16 may be set to a temperature that can achieve the required amount of dehumidification (for example, 100 g/h). The target temperature TCO of the cooler core 16 may be set to a preset value (for example, in a range of 1° C. to 10° C.) previously stored in the controller.

Next, examples of the control of the dehumidification amount in the compressor-on mode and the compressor-off mode will be described. While a vehicle-interior air humidity RH is below the window fogging index RHW (RH<RHW), when a target vehicle-interior air humidity RHO exceeds the window fogging index RHW (RHO>RHW), the target vehicle-interior air humidity RHO is changed to a value obtained by subtracting the safety factor γ from the window fogging index RHW (RHO=RHW−γ).

On the other hand, when the target vehicle-interior air humidity RHO does not exceed the window fogging index RHW, the target vehicle-interior air humidity RHO is not changed.

In the compressor-on mode, the refrigerant discharge capacity (number of revolutions) of the compressor 32 is controlled such that the vehicle-interior air humidity RH approaches the target vehicle-interior air humidity RHO.

In the compressor-off mode, the flow rate of coolant flowing through the radiator 13 and the flow rate of coolant flowing through the cooler core 16 are adjusted such that the vehicle-interior air humidity RH approaches the target vehicle-interior air humidity RHO. The blowing capacity (number of revolutions) of the exterior blower 30 is adjusted when the flow rate of coolant flowing through the radiator 13 and the flow rate of coolant flowing through the cooler core 16 are equal to or more than respective predetermined flow rates.

When a cold heat device (cold storage body) is connected to the low-temperature side coolant circuit, the flow rate of coolant flowing through the cold heat device (cold storage body) may be adjusted such that the vehicle-interior air humidity RH approaches the target vehicle-interior air humidity RHO. When the flow rate of coolant flowing through the cold heat device (cold storage body) is equal to or more than a predetermined flow rate, the blowing capacity (number of revolutions) of the exterior blower 30 may be adjusted.

In this embodiment, the first switching valve 21 and the second switching valve 22 are switched between the compressor-on mode (first dehumidification mode) in which the coolant circulates between the cooler core 16 and the coolant cooler 14 and the compressor-off mode (second dehumidification mode) in which the coolant circulates between the cooler core 16 and the radiator 13.

Thus, in the compressor-off mode, the coolant cooled by the outside air at the radiator 13 can circulate through the cooler core 16, thereby dehumidifying the ventilation air passing into the vehicle interior. Thus, in the compressor-off mode, the power required to suppress fogging of a window glass can be reduced, compared with the compressor-on mode in which the coolant cooled by the low-pressure side refrigerant at the coolant cooler 14 in the refrigeration cycle 31 is allowed to circulate through the cooler core 16, thereby dehumidifying the ventilation air passing into the vehicle interior.

Specifically, the switching control unit 70b of the controller 70 switches between the compressor-on mode and the compressor-off mode by controlling the operations of the first switching valve 21 and the second switching valve 22 based on at least one of the inside-air temperature, the inside-air humidity, the outside-air temperature, the coolant temperature, and the window glass temperature, which are the results of detection by various sensors.

More specifically, as explained in the description of step S160, the switching control unit 70b of the controller 70 controls the operations of the first and second switching valves 21 and 22 to switch to the compressor-off mode when the temperature in connection with the outside-air temperature is less than a predetermined outside-air temperature in connection with the dew-point temperature of ventilation air flowing into the cooler core 16.

In this way, when the outside-air temperature is low, the thermal management system is switched to the compressor-off mode, thereby enabling reduction in power required to suppress fogging of the window glass.

In this embodiment, the first pump 11, the first switching valve 21, the second switching valve 22, and the exterior blower 30 adjust at least one of the flow rate of coolant flowing through the radiator 13, the flow rate of outside air flowing through the radiator 13, and the flow rate of coolant flowing through the cooler core 16.

Specifically, in the compressor-off mode, the flow-rate control units 70a, 70b, and 70c of the controller 70 control the operations of the first pump 11, the first switching valve 21, the second switching valve 22, and the exterior blower 30 such that the temperature in connection with the temperature TC of ventilation air blown from the cooler core 16 approaches the target temperature TCO.

Thus, in the compressor-off mode, the dehumidification capacity of the cooler core 16 can be appropriately adjusted to thereby suppress fogging of a window glass as appropriate. Further, frost formation on the cooler core 16 can be suppressed.

In this embodiment, the window-fogging-index calculating portion 70i of the controller 70 calculates the window fogging index RHW based on the surface temperature of the windshield, and inside-air temperature and humidity in the vicinity of the windshield, which are detected by the composite sensor 88.

In the compressor-off mode, the flow-rate control units 70a, 70b, and 70c of the controller control the operations of the first pump 11, first switching valve 21, second switching valve 22, and exterior blower 30 based on the window fogging index RHW calculated by the window-fogging-index calculating portion 70i, thereby adjusting at least one of the flow rate of coolant flowing through the radiator 13, the flow rate of outside air flowing through the radiator 13, and the flow rate of coolant flowing through the cooler core 16.

Thus, in the compressor-off mode, the dehumidification capacity of the cooler core 16 can be approximately adjusted, thereby suppressing the fogging on the window glass as appropriate.

In the compressor-off mode (second dehumidification mode), the switching control unit 70b of the controller 70 may control the operations of the first pump 11, the first switching valve 21, the second switching valve 22, and the exterior blower 30 in the following way. That is, at least one of the flow rate of coolant flowing through the radiator 13, the flow rate of outside air flowing through the radiator 13, and the flow rate of coolant flowing through the cooler core 16 increases as a difference obtained by subtracting the dew-point temperature at the window glass from the temperature of the window glass decreases.

For example, the dew-point temperature at the window glass can be calculated by the controller 70. That is, the controller 70 may serve as a dew-point temperature calculating portion that calculates the dew-point temperature at the window glass based on the inside-air temperature, the inside-air humidity, and the temperature of the window glass.

In this embodiment, the flow-rate control units 70a, 70b, and 70c of the controller switch between the compressor-on mode and the compressor-off mode by controlling the operations of the first and second switching valves 21 and 22 based on the window fogging index RHW calculated by the window-fogging-index calculating portion 70i.

Thus, the controller can appropriately switch between the compressor-on mode and the compressor-off mode depending on the degree of window fogging.

In the compressor-off mode (second dehumidification mode), the switching control unit 70b of the controller 70 may switch between the compressor-on mode and the compressor-off mode by controlling the operations of the first switching valve 21 and the second switching valve 22 based on a difference obtained by subtracting the dew-point temperature of the window glass from the temperature of the window glass.

In this embodiment, when the pump failure detecting portion 70j of the controller 70 detects the failure of the first pump 11, the inside/outside air switching control unit 70f of the controller 70 controls the operation of the inside/outside air switching door 53 to switch to the outside-air introduction mode.

Thus, when the first pump 11 is broken and the ventilation air cannot be dehumidified by the cooler core 16, the outside air having the same or lower temperature than that of the windshield is introduced into the vehicle interior, thereby enabling prevention of window fogging.

In this embodiment, the first switching valve 21 and the second switching valve 22 are capable of switching between a first circulation state in which the coolant discharged from the first pump 11 circulates through between the radiator 13 and the coolant-to-coolant heat exchanger 18 and inverter 19 (a heat transfer portion for transferring heat with a heat generating device), and a second circulation state in which the coolant discharged from the second pump 12 circulates through between the heater core 17 and the coolant-to-coolant heat exchanger 18 and inverter 19.

When the compressor failure detecting portion 70k of the controller 70 detects the failure of the compressor 32, the switching control unit 70b of the controller 70 controls the operations of the first switching valve 21 and the second switching valve 22 to switch to the second circulation state.

In this way, when the coolant cooler 14 cannot cool the coolant due to the failure of the compressor 32, the coolant heated by the coolant-to-coolant heat exchanger 18 and the inverter 19 is allowed to circulate through the heater core 17, thereby heating the ventilation air. Thus, the ventilation air heated by the heater core 17 is blown out to the window glass, thereby heating the window glass, so that the fogging of the window glass can be suppressed because of an increase in dew-point temperature of the air in the vicinity of the window glass.

When the leakage of the refrigerant from the refrigeration cycle 31 is determined or detected, or when the amount of refrigerant in the refrigeration cycle 31 is determined or detected to be less than a predetermined amount, the controller 70 may control the operations of the first switching valve 21 and the second switching valve 22 in such a way as to switch from the compressor-on mode (first dehumidification mode) to the compressor-off mode (second dehumidification mode).

With this arrangement, even when the refrigeration cycle 31 cannot be operated because of a shortage of the refrigerant in the refrigeration cycle 31, the coolant cooled by the outside air at the radiator 13 is allowed to circulate through the cooler core 16, thereby enabling cooling and dehumidification of the ventilation air passing into the vehicle interior.

Second Embodiment

Figure 7:
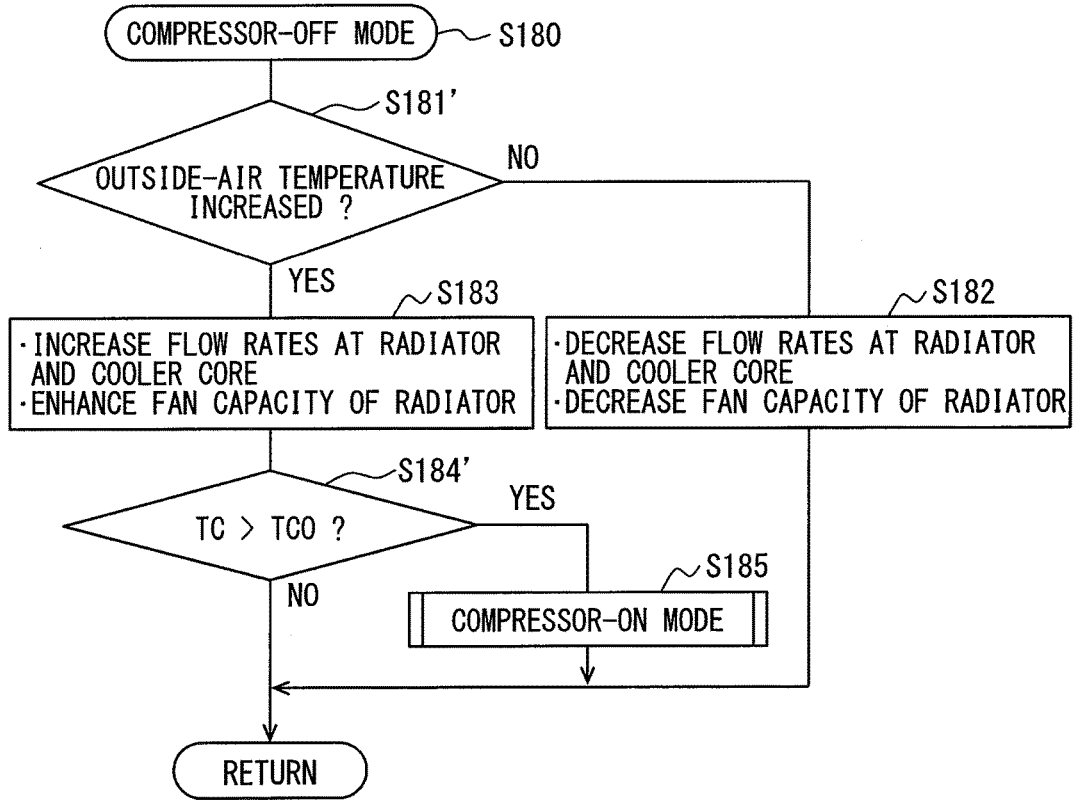
FIG. 7 is a flowchart showing control processing in a compressor-off mode according to a second embodiment.

In this embodiment, as shown in FIG. 7, steps S181 and S184 in the flowchart of FIG. 6 of the first embodiment are changed to steps S181' and S184'.

In step S181', it is determined whether the temperature of the outside air increases or not. When the outside-air temperature is determined not to increase, the operation proceeds to step S182, whereas when the outside-air temperature is determined to increase, the operation proceeds to step S183.

In step S184', it is determined whether the surface temperature TC of the cooler core 16 exceeds the target temperature TCO or not. When the surface temperature TC of the cooler core 16 is determined to exceed the target temperature TCO, it is determined that the window fogging cannot be prevented in the compressor-off mode. Then, the operation proceeds to step S185, in which the thermal management system is transferred to the compressor-on mode.

As mentioned above, in this embodiment, in the compressor-off mode (second dehumidification mode), the flow-rate control units 70a, 70b, and 70c of the controller 70 control the operations of the first pump 11, the first and second switching valves 21 and 22, and the exterior blower 30 in such a manner that at least one of the flow rate of coolant flowing through the radiator 13, the flow rate of outside air flowing through the radiator 13, and the flow rate of coolant flowing through the cooler core 16 increases as the outside-air temperature is raised.

Therefore, the reduction in dehumidification capacity of the cooler core 16 with an increase in outside-air temperature can be suppressed.

In the compressor-off mode (second dehumidification mode), the flow-rate control units 70a, 70b, and 70c increase at least one of the flow rate of coolant through the radiator 13, the flow rate of outside air through the radiator 13, and the flow rate of coolant through the cooler core 16 to a predetermined flow rate or more. Thereafter, the switching control unit 70b of the controller 70 controls the operations of the first and second switching valves 21 and 22 to switch to the compressor-on mode (first dehumidification mode).

Thus, after increasing the dehumidification capacity in the compressor-off mode, the thermal management system is switched to the compressor-on mode, so that its dehumidification capacity can be ensured as much as possible in the compressor-off mode, and furthermore the power required to suppress the fogging of the window glass can be reduced to the utmost.

In the compressor-off mode (second dehumidification mode), the temperature in connection with the temperature TC of ventilation air blown from the cooler core 16 sometimes exceeds the target temperature TCO, even though the flow-rate control units 70a, 70b, and 70c increase at least one of the flow rate of coolant flowing through the radiator 13, the flow rate of outside air flowing through the radiator 13, and the flow rate of coolant flowing through the cooler core 16 to a predetermined flow rate or more. In such a case, the switching control unit 70b of the controller 70 controls the operations of the first and second switching valves 21 and 22 to switch to the compressor-on mode.

Thus, when the dehumidification capacity is lacking in the compressor-off mode, the thermal management system can be switched to the compressor-on mode, thereby ensuring the dehumidification capacity.

Third Embodiment

Figure 8:
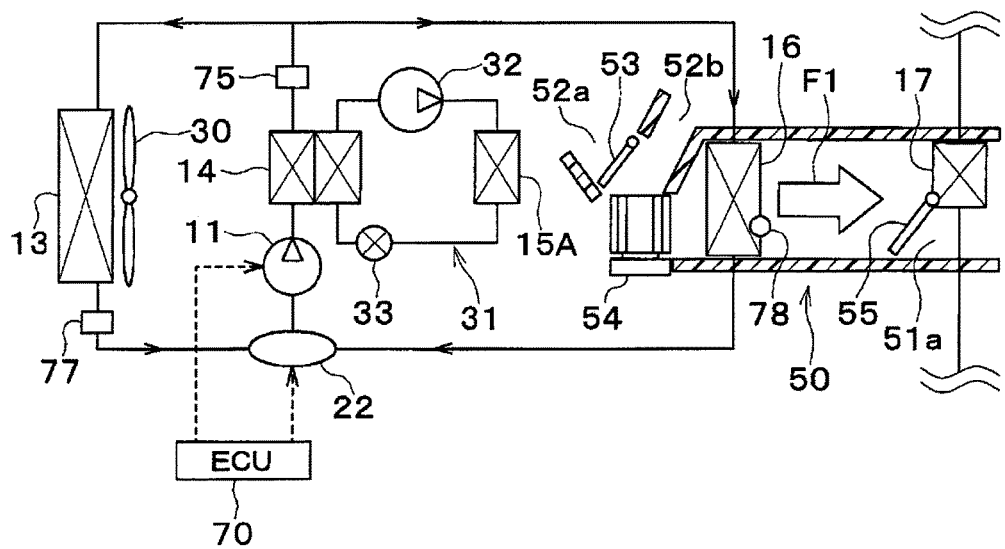
FIG. 8 is an entire configuration diagram of a vehicle thermal management system according to a third embodiment.

Although in the first embodiment, the thermal management system can be switched between a state of connection of the radiator 13 to the low-temperature side coolant circuit and a state of connection thereof to the high-temperature side coolant circuit, in this embodiment, the radiator 13 is constantly connected to the low-temperature side coolant circuit as shown in FIG. 8.

The refrigeration cycle 31 is provided with a condenser 15A that condenses a high-pressure side refrigerant by exchanging heat between the high-pressure side refrigerant discharged from the compressor 32 and the outside air.

Although not shown, the heater core 17 is adapted to allow the coolant (engine coolant) for the engine cooling circuit 60 to circulate through the heater core 17. The heater core 17 may allow for circulate of hot water (heat medium) heated with the high-pressure side refrigerant in the refrigeration cycle 31 therethrough. An electric heater (for example, a PTC heater) may be disposed instead of the heater core 17.

The second switching valve 22 switches between a state in which the coolant cooled by the radiator 13 flows through the cooler core 16 and a state in which the coolant does not flow therethrough.

Like the above-mentioned embodiments, this embodiment can also switch between the compressor-on mode and the compressor-off mode, thereby enabling the same function effects as those of the above-mentioned embodiments.

Fourth Embodiment

Figure 9:
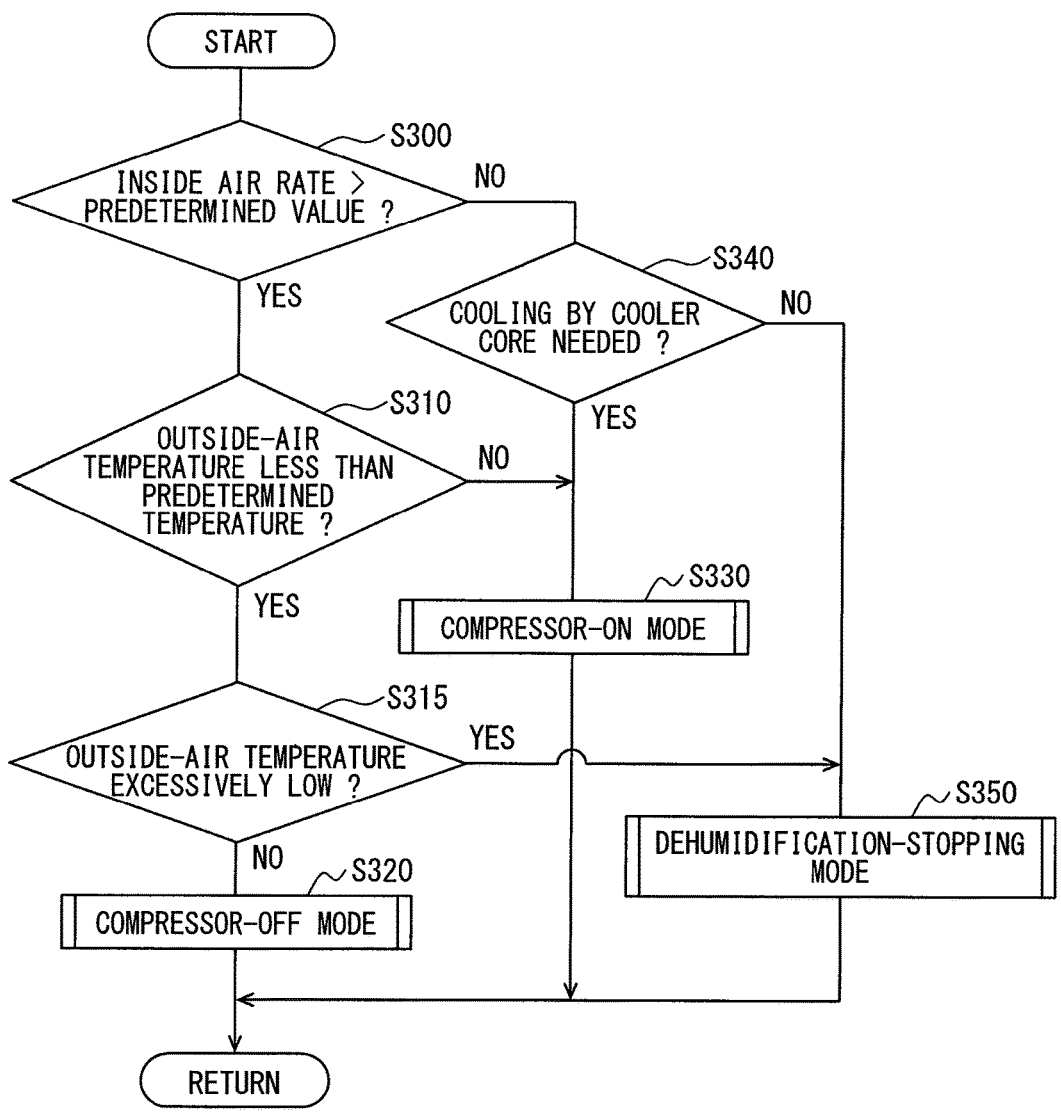
FIG. 9 is a flowchart showing control processing executed by a controller according to a fourth embodiment.

Although in the above-mentioned embodiments, the controller 70 executes the control processing shown in the flowchart of FIG. 3 to select either the compressor-on mode (first dehumidification mode) or the compressor-off mode (second dehumidification mode), in this embodiment, the controller 70 executes control processing shown in the flowchart of FIG. 9 to select either the compressor-on mode (first dehumidification mode) or the compressor-off mode (second dehumidification mode).

In step S300, it is determined whether the inside air rate exceeds a predetermined value (for example, 30%) or not. The inside air rate is the rate of the inside air in air (inside air and outside air) introduced into the casing 51 through the inside/outside air switching case 52.

When the inside air rate exceeds the predetermined value (for example, 30%), a difference in temperature between the air flowing into the cooler core 16 and the coolant cooled by the outside air at the radiator 13 can be estimated to be large. In other words, the air flowing into the cooler core 16 can be estimated to be sufficiently cooled and dehumidified with the coolant cooled by the radiator 13.

When the inside air rate is determined to exceed the predetermined value (for example, 30%) in step S300, the operation proceeds to step S310, in which it is determined whether the outside-air temperature is less than the predetermined temperature or not. The predetermined temperature is a temperature value in connection with a temperature value that is lower than the dew-point temperature of air in the vicinity of the window glass in the vehicle interior. That is, assuming that the compressor-off mode is selected in step S310, it is determined whether or not the air can be cooled at the cooler core 16 to the temperature lower than the dew-point temperature of air in the vicinity of the window glass in the vehicle interior.

When the outside-air temperature is determined to be less than the predetermined temperature in step S310, the operation proceeds to step S315, in which it is determined whether the outside-air temperature is excessively low or not (for example, less than 20° C. below zero). When the outside-air temperature is determined not to be excessively low in step S315, the operation proceeds to step S320, in which the compressor off-mode is selected.

Thus, the coolant cooled by the outside air at the radiator 13 is allowed to flow through the cooler core 16, thereby enabling cooling and dehumidification of the air at the cooler core 16. That is, the air can be cooled and dehumidified by the cooler core 16 without operating (turning on) the compressor 32, thereby saving power.

On the other hand, when the outside-air temperature is determined not to be less than the predetermined temperature in step S310, the operation proceeds to step S330, in which the compressor on-mode is selected. Thus, the compressor 32 is operated to cool the coolant by means of the coolant cooler 14, and the cooled coolant circulates through the cooler core 16, so that the air can be surely cooled and dehumidified by the cooler core 16.

On the other hand, when the inside air rate is determined not to exceed the predetermined value (for example, 30%) in step S300, the operation proceeds to step S340, in which it is determined whether the cooler core 16 needs to cool the air or not. Specifically, when the target temperature TCO of the cooler core 16 is below the temperature of air flowing into the cooler core 16, it is determined that the air needs to be cooled by the cooler core 16.

When it is determined that the air needs to be cooled by the cooler core 16 in step S340, the operation proceeds to step S340, in which the compressor on-mode is selected. Thus, the compressor 32 is operated to cool the coolant by means of the coolant cooler 14, and the cooled coolant circulates through the cooler core 16, so that the air can be surely cooled and dehumidified by the cooler core 16.

On the other hand, when it is determined that the air does not need to be cooled by the cooler core 16 in step S340, the operation proceeds to step S350, in which the dehumidification-stopping mode is selected. The dehumidification-stopping mode is an air-conditioning mode of blowing the air into the vehicle interior without cooling the air by the cooler core 16. Therefore, in the dehumidification-stopping mode, the compressor 32 is stopped while the supply of the coolant to the cooler core 16 is interrupted. In the dehumidification-stopping mode, the inside/outside air switching door 53 is switched to the outside-air introduction mode.

Further, when the outside-air temperature is determined to be excessively low in step S315, the operation proceeds to step S350, in which the dehumidification-stopping mode is selected.

Thus, when neither the compressor-on mode nor compressor-off mode can be performed because of the excessively low outside-air temperature, the air having a high rate of outside air can be blown to suppress the window fogging.

That is, when the outside-air temperature is excessively low (for example, less than 20° C. below zero), even the reduction in flow rate of the cooler core 16 makes it difficult to prevent the frost formation, whereby the operation in the compressor-off mode cannot be operated, and also the operation in the compressor-on mode of operating the compressor 32 cannot also be operated. In this case, the thermal management system is switched to the dehumidification-stopping mode to set the inside air rate to 0% and to introduce the outside air, whereby the absolute humidity of the ventilation air is lowered to suppress the window fogging.

Figure 10:
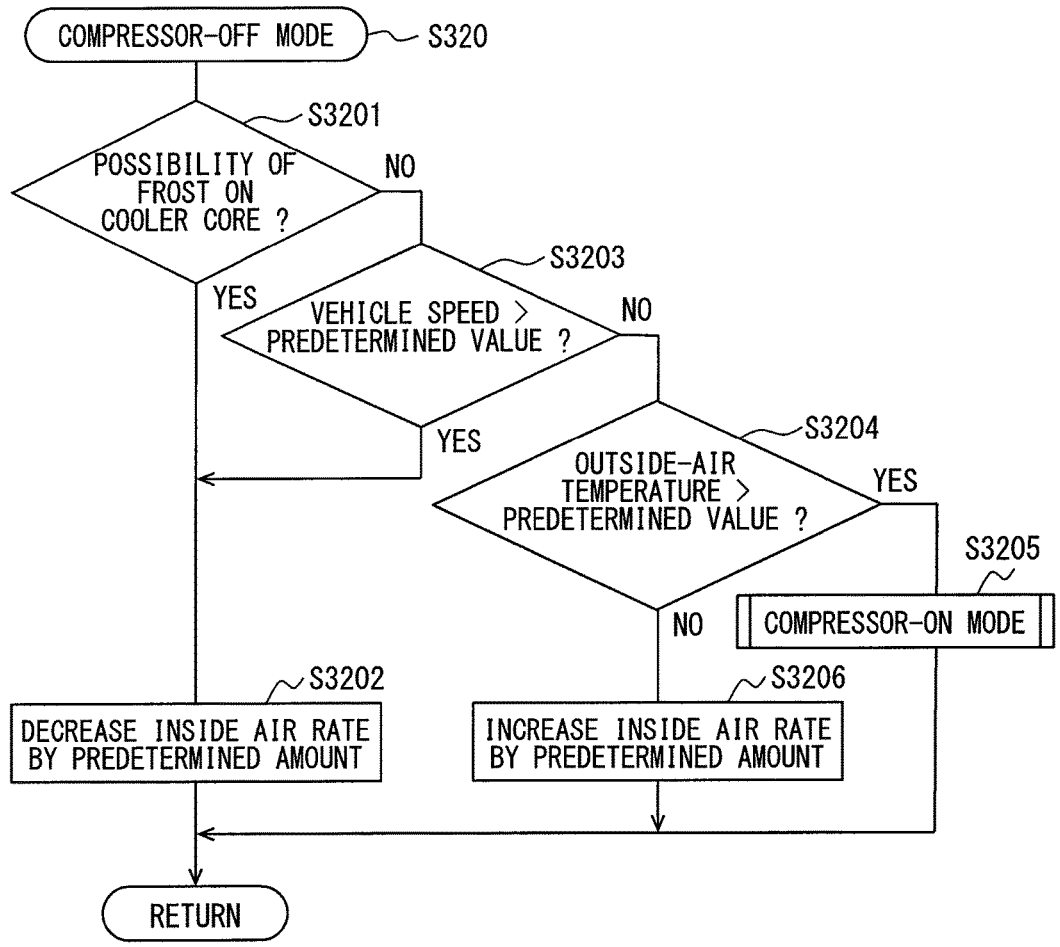
FIG. 10 is a flowchart showing the control processing in a compressor-off mode of the fourth embodiment.

FIG. 10 is a flowchart showing specific control processing in the compressor-off mode at step S320. In step S3201, it is determined whether or not the frost formation could occur in the cooler core 16. Specifically, it is determined whether or not the outside-air temperature is lower than the predetermined temperature. This is because once the outside-air temperature is low, the temperature of air flowing into the cooler core 16 is decreased to enhance the possibility of freezing the condensed water on the surface of the cooler core 16.

When frost formation is determined to possibly occur at the cooler core 16 in step S3201, the operation proceeds to step S3202, in which the inside air rate is decreased by a predetermined amount. When the inside air rate is already 0%, the inside air rate is kept at 0%.

In this way, the amount of generation of condensed water in the cooler core 16 can be decreased to thereby suppress the frost formation at the cooler core 16.

In step S3202, as the inside air rate is reduced, the flow rate of the cooler core 16 is suppressed to the low level, whereby the surface temperature of the cooler core 16 is prevented from being under a freezing temperature.

For example, the output from the first pump 11 or second pump 12 is restricted to enable suppressing the flow rate of the cooler core 16 to a low level.

For example, the valve opening degree of at least one of the first and second switching valves 21 and 22 can be adjusted to suppress the flow rate at the cooler core 16 to a low level. The valve opening degree may be continuously reduced thereby suppressing the flow rate of the cooler core 16 to the low level, and alternatively the circulation of coolant to the cooler core 16 may be intermittently blocked to restrict the flow rate on an hourly average basis.

In step S3202, the rate of outside air can be increased to suppress the absolute humidity of air flowing into the cooler core 16, so that the humidity of air blown toward the window glass can also be reduced to a lower level, further preventing the occurrence of window fogging.

On the other hand, when frost formation is determined to have no possibility of occurring at the cooler core 16 in step S3201, the operation proceeds to step S3203, in which it is determined whether or not the vehicle speed exceeds a predetermined speed. The predetermined speed is a speed value in connection with a temperature value lower than the dew-point temperature of air in the vicinity of the window glass. That is, as the vehicle speed is higher, the temperature of the window glass is decreased, making it more likely to cause window fogging.

When the vehicle speed is determined to exceed the predetermined speed, the operation proceeds to step S3202, in which the inside air rate is decreased by a predetermined amount. When the inside air rate is already 0%, the inside air rate is kept at 0%.

In this way, the humidity of air flowing into the cooler core 16 can be suppressed, so that the humidity of air blown toward the window glass can also be reduced to a low level, further preventing the occurrence of window fogging.

On the other hand, when the vehicle speed is determined not to exceed the predetermined speed in step S340, the operation proceeds to step S3204, in which it is determined whether the outside-air temperature exceeds a predetermined temperature or not. The predetermined temperature is, for example, the target temperature TCO of the cooler core 16.

When the outside-air temperature is determined to exceed the predetermined temperature, it can be judged that the coolant cannot be sufficiently cooled by the radiator 13 and that the air cannot be sufficiently dehumidified by the cooler core 16 in the compressor-off mode. Then, the operation proceeds to step S3205, in which the compressor-on mode is selected.

Thus, the compressor 32 is operated to cool the coolant by means of the coolant cooler 14, and the cooled coolant circulates through the cooler core 16, so that the air can be cooled and dehumidified by the cooler core 16.

On the other hand, when the outside-air temperature is determined not to exceed the predetermined temperature in step S3204, the operation proceeds to step S3206, in which the inside air rate is increased by a predetermined amount. When the inside air rate is already 100%, the inside air rate is kept at 100%.

In this way, the temperature of air flowing into the cooler core 16 can be increased as highly as possible, so that the temperature of air blown toward the vehicle interior can also be increased to as a high level as possible, further enhancing the occupant's warming feeling.

Even when the inside-air mode is selected with the air outside the vehicle polluted, the operation of the compressor 32 can be suppressed as much as possible, thereby enabling reduction in power consumption for air conditioning. The polluted air outside the vehicle includes, for example, air containing a large amount of fine particles (PM2.5) or pollen, and air containing a high concentration of exhaust gas, like air in tunnels.

Figure 11:
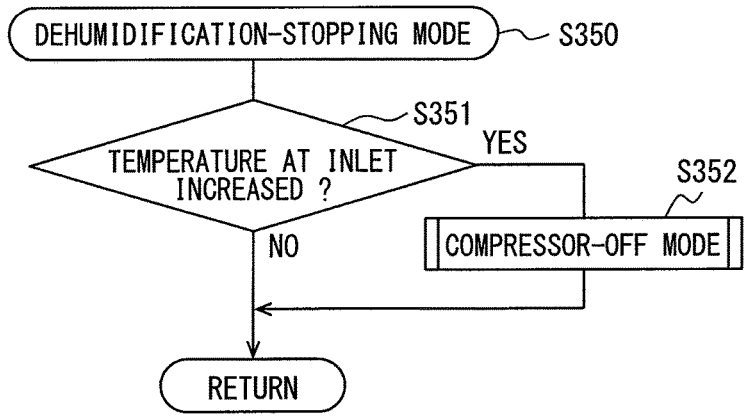
FIG. 11 is a flowchart showing the control processing in a dehumidification-stopping mode of the fourth embodiment.

FIG. 11 is a flowchart showing specific control processing in the dehumidification-stopping mode at step S350. In step S351, it is determined whether or not the temperature of air introduced into the casing 51 through the inside/outside air switching case 52 is increased to a temperature that is higher than the outside-air temperature by a predetermined temperature or more.

The cases in which the temperature of air introduced into the casing 51 is higher than the outside-air temperature can include, for example, the case in which the air to be introduced into the casing 51 is heated due to an increase in temperature of an engine room, when the engine is in an idling state, or the like.

When the temperature of air introduced into the casing 51 is determined to increase to a temperature that is higher than the outside-air temperature by the predetermined temperature (e.g., 5° C.) or more in step S351, the operation proceeds to step S352, in which the compressor-off mode is selected. Thus, the coolant cooled by the outside air at the radiator 13 is allowed to circulate through the cooler core 16, thereby enabling cooling and dehumidification of the air at the cooler core 16.

Therefore, when the temperature of air introduced into the casing 51 is higher than the outside-air temperature, the air can be cooled and dehumidified by the cooler core 16 without operating the compressor 32, thereby enabling power saving.

On the other hand, when the temperature of air introduced into the casing 51 is determined not to be increased to the temperature higher than the outside-air temperature by the predetermined temperature or more in step S351, the dehumidification-stopping mode is maintained.

In this embodiment, as explained in the description of step S350, the inside/outside air switching door 53, the first switching valve 21, and the second switching valve 22 are switchable in the dehumidification-stopping mode. The dehumidification-stopping mode is an operation mode in which the rate of the outside air in the air to be blown into the vehicle interior is equal to or more than a predetermined rate, and the coolant does not circulate through the cooler core 16.

Thus, in the dehumidification-stopping mode, the coolant does not circulate through the cooler core 16, whereby the power consumption in the compressor 32 and the pump 11 can be reduced.

In this embodiment, as explained in the description of steps S310 and S320, the switching control unit 70b of the controller 70 controls the operations of the first switching valve 21 and the second switching valve 22 to switch to the compressor-off mode (second dehumidification mode) when the outside-air temperature is less than the predetermined temperature. Thus, when the temperature of outside air is low, the thermal management system is switched to the compressor-off mode, thereby enabling power saving.

In the control processing shown in the flowchart of FIG. 9, the pressure of the refrigeration cycle 31 (for example, the pressure at a suction portion of the compressor 32) is sometimes less than the predetermined pressure in intending to cool and dehumidify the ventilation air passing into the vehicle interior. In such a case, the switching control unit 70b of the controller 70 may control the operations of the first and second switching valves 21 and 22 to cool and dehumidify the ventilation air passing into the vehicle interior in the second dehumidification mode.

Thus, even when the refrigeration cycle 31 cannot be operated because of a low outside-air temperature or a leakage of refrigerant from the refrigeration cycle 31, the coolant cooled by the outside air at the radiator 13 is allowed to circulate through the cooler core 16, thereby enabling cooling and dehumidification of the ventilation air passing into the vehicle interior.

In this embodiment, as explained in the description of steps S315 and S350, the switching control unit 70b of the controller 70 controls the operations of the first switching valve 21 and the second switching valve 22 to switch to the dehumidification-stopping mode when the outside-air temperature is less than the predetermined temperature.

Thus, when neither the compressor-on mode nor compressor-off mode can be performed because of the excessively low outside-air temperature, the air having a high rate of outside air can be blown to suppress the window fogging.

That is, when the outside-air temperature is significantly low (for example, less than 20° C. below zero), even the reduction in flow rate of the cooler core 16 makes it difficult to prevent the frost formation, whereby the operation in the compressor-off mode cannot be operated, and also the operation in the compressor-on mode of operating the compressor 32 cannot also be operated. In this case, the thermal management system is switched to the dehumidification-stopping mode to set the inside air rate to 0% and to introduce the outside air, whereby the absolute humidity of the ventilation air is lowered to suppress the window fogging.

In this embodiment, as explained in the description of steps S300 and S320, the switching control unit 70b of the controller 70 controls the operations of the first switching valve 21 and the second switching valve 22 to switch to the compressor-off mode (second dehumidification mode) when the rate of inside air in the air to be blown into the vehicle interior is equal to or more than the predetermined rate.

With this arrangement, the thermal management system is switched to the second dehumidification mode when the temperature of air to flow into the cooler core 16 becomes high, so that the air flowing into the cooler core 16 can be surely cooled and dehumidified by the coolant cooled by the radiator 13.

In the control processing shown in the flowchart of FIG. 9, the switching control unit 70b of the controller 70 may control the operations of the first and second switching valves 21 and 22 to switch to the compressor-off mode (second dehumidification mode) when the inside/outside air selector switch 89c is operated by the occupant (for example, when the inside-air introduction mode is set), and the outside-air temperature is less than the predetermined temperature.

With this arrangement, the thermal management system is switched to the compressor-off mode (second dehumidification mode) when the rate of inside air in the air to be blown into the vehicle interior is increased, and the temperature of air flowing into the cooler core 16 becomes high, so that the air flowing into the cooler core 16 can be surely cooled and dehumidified by the coolant cooled by the radiator 13.

In this embodiment, as explained in the description of steps S351 and S352, the switching control unit 70*b* of the controller 70 controls the operations of the first and second switching valves 21 and 22 to switch to the compressor-off mode (second dehumidification mode) when the temperature of ventilation air drawn into the cooler core 16 is higher than the temperature in connection with the outside-air temperature by the predetermined temperature or more.

In this way, the operations of the switching valves are switched to the compressor-off mode (second dehumidification mode) when the air introduced into the casing 51 is heated to become at a temperature higher than the outside-air temperature, for example, when the temperature of the engine room is increased because of the idling state of the vehicle. Therefore, the air flowing into the cooler core 16 can be surely cooled and dehumidified by the coolant cooled by the radiator 13 without operating the compressor 32, thereby enabling power saving.

In this embodiment, as explained in the description of steps S3203 and S3202, the switching control unit 70*b* of the controller 70 controls the operation of the inside/outside air switching door 53 such that the rate of the outside air in the ventilation air is increased when the vehicle speed is higher than the predetermined speed in the compressor-off mode (second dehumidification mode).

In this way, the humidity of air flowing into the cooler core 16 can be suppressed when window fogging is more likely to occur because of a decrease in temperature of a window glass, so that the humidity of air blown toward the window glass can also be reduced to a low level, further preventing the occurrence of window fogging.

The switching control unit 70*b* of the controller 70 may control the operation of the inside/outside air switching door 53 such that the rate of outside air in the ventilation air is increased with a decreasing temperature of the outside air in the compressor-off mode (second dehumidification mode).

With this arrangement, the absolute humidity of air flowing into the cooler core 16 can be reduced when frost formation is more likely to occur on the cooler core 16 because of a decrease in temperature of the coolant flowing into the cooler core 16. Thus, the amount of condensed water generated at the cooler core 16 can be decreased, further suppressing the frost formation at the cooler core 16.

Once the frost formation occurs on the cooler core 16, the condensed water is frozen to close an air path of the cooler core 16 therewith, resulting in a decrease in volume of the air to be blown into the vehicle interior or failing to blow out the air. As a result, the shortage of a heating capacity makes the occupant feel uncomfortable, failing to suppress a window fogging sufficiently.

Thus, the flow rate of coolant in the cooler core 16 is reduced, thereby suppressing the frost formation on the cooler core 16. The flow rate of coolant in the cooler core 16 may be continuously reduced, or may be reduced on an hourly average basis by intermittently interrupting circulation of the coolant to the cooler core 16.

The flow rate of coolant in the radiator 13 may be reduced to increase the flow rate of coolant bypassing the radiator 13, so that the amount of cold heat received at the radiator 13 is decreased to suppress the frost formation on the cooler core 16.

In other words, when the frost formation is determined or estimated to occur, the flow rate of coolant in the cooler core 16 or the flow rate of coolant in the radiator 13 is decreased. Thus, the operation of the inside/outside air switching door 53 is controlled in such a manner that as the flow rate of coolant in the cooler core 16 or the flow rate of coolant in the radiator 13 is decreased, the rate of the outside air in the ventilation air is increased.

In this embodiment, as explained in the description of steps S3201 and S3202, the switching control unit 70*b* of the controller 70 controls the operation of the inside/outside air switching door 53 such that as the flow rate of the coolant in the cooler core 16 is decreased, the rate of the outside air in the ventilation air is increased in the compressor-off mode (second dehumidification mode).

Thus, the amount of condensed water generated at the cooler core 16 can be decreased when the frost formation is more likely to occur on the cooler core 16, whereby the frost formation at the cooler core 16 can be suppressed.

The switching control unit 70*b* of the controller 70 performs switching to the dehumidification-stopping mode and sets the rate of the outside air in the ventilation air to 100% when frost formation is determined or estimated to occur on the cooler core 16 in the compressor-off mode (second dehumidification mode). Thus, the amount of condensed water generated on the cooler core 16 can be further decreased, thereby suppressing the occurrence of frost on the cooler core 16 even more.

The switching control unit 70*b* of the controller 70 may control the operation of the inside/outside air switching door 53 such that the rate of the outside air in the ventilation air is increased when the temperature in connection with the outside-air temperature is less than the predetermined temperature in the compressor-off mode (second dehumidification mode). The temperature in connection with the outside-air temperature is, for example, a temperature of the coolant. The predetermined temperature is a temperature (e.g., −10° C.) that is more likely to cause frost formation on the cooler core 16.

With this arrangement, the humidity of air flowing into the cooler core 16 can be reduced when frost formation is more likely to occur on the cooler core 16 because of a decrease in temperature of the coolant flowing into the cooler core 16. Thus, the amount of condensed water generated at the cooler core 16 can be decreased, further suppressing the frost formation at the cooler core 16.

The switching control unit 70*b* of the controller 70 controls the operations of the first and second switching valves 21 and 22 so as to allow the coolant to flow bypassing the coolant cooler 14 when the temperature in connection with the temperature of refrigerant in the coolant cooler 14 is higher than the temperature in connection with the temperature of coolant flowing through the cooler core 16.

With this arrangement, when the temperature of coolant is lower than that of refrigerant in the coolant cooler 14, various failures, such as lock or breakage caused by liquid compression, can be prevented at start-up of the compressor 32 due to condensation of the refrigerant at the coolant cooler 14.

Fifth Embodiment

Figure 12:
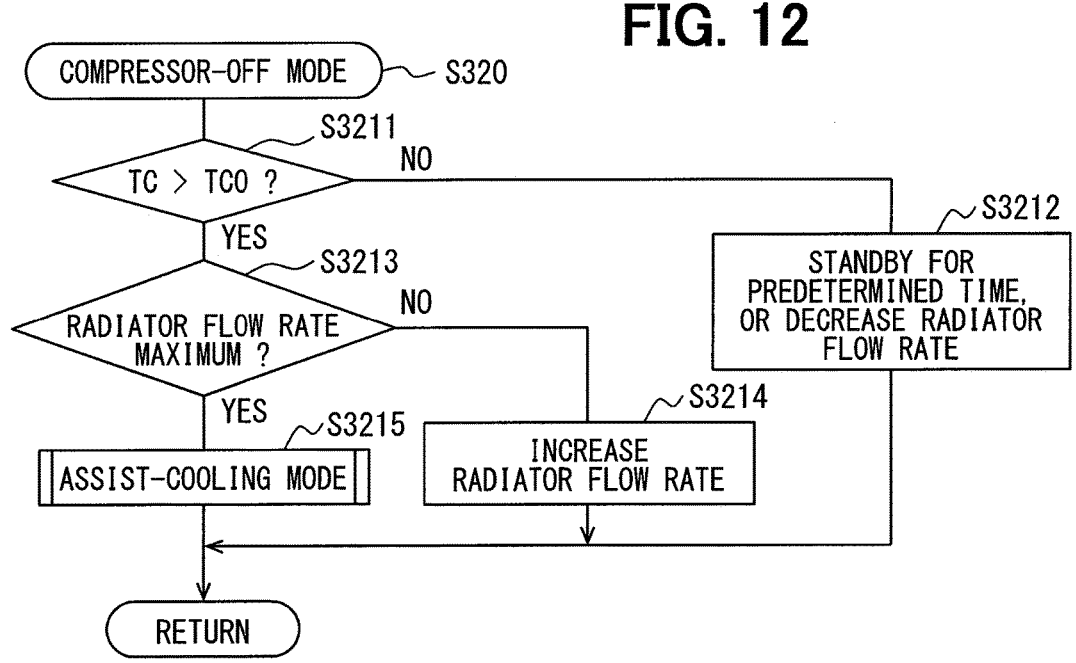
FIG. 12 is a flowchart showing control processing in a compressor-off mode according to a fifth embodiment.

In this embodiment, the controller 70 executes control processing in the compressor-off mode (second dehumidification mode) as shown in the flowchart of FIG. 12.

In step S3211, it is determined whether or not the surface temperature TC of the cooler core 16 exceeds the target temperature TCO of the cooler core 16.

When the surface temperature TC of the cooler core 16 is determined not to exceed the target temperature TCO of the cooler core 16 in step S3211, the operation proceeds to step S3212, in which the predetermined stand-by time, or the flow rate of coolant flowing through the radiator 13 is decreased by a predetermined amount. Then, the operation is returned to step S3211.

On the other hand, when the surface temperature TC of the cooler core 16 is determined to exceed the target temperature TCO of the cooler core 16 in step S3211, the operation proceeds to step S3213, in which it is determined whether the flow rate of coolant flowing through the radiator 13 is maximized or not.

When the flow rate of coolant flowing through the radiator 13 is determined not to be maximized in step S3213, the operation proceeds to step S3214, in which the flow rate of coolant flowing through the radiator 13 is increased by a predetermined amount.

On the other hand, when the flow rate of coolant flowing through the radiator 13 is determined to be maximized in step S3213, the operation proceeds to step S3215, in which an assist cooling mode (third dehumidification mode) is selected. The assist cooling mode is an air-conditioning mode of compensating for a shortage of the air cooling capacity by the refrigeration cycle 31 when the air cooling capacity is lacking for cooling with the outside air. Therefore, in the assist cooling mode, the compressor 32 is operated (turned on) while allowing the coolant to circulate among the cooler core 16, the coolant cooler 14, and the radiator 13.

In step S3215, the flow rate of coolant flowing through the radiator 13 is restored to that before being changed in steps S3212 and S3214.

Figure 13:
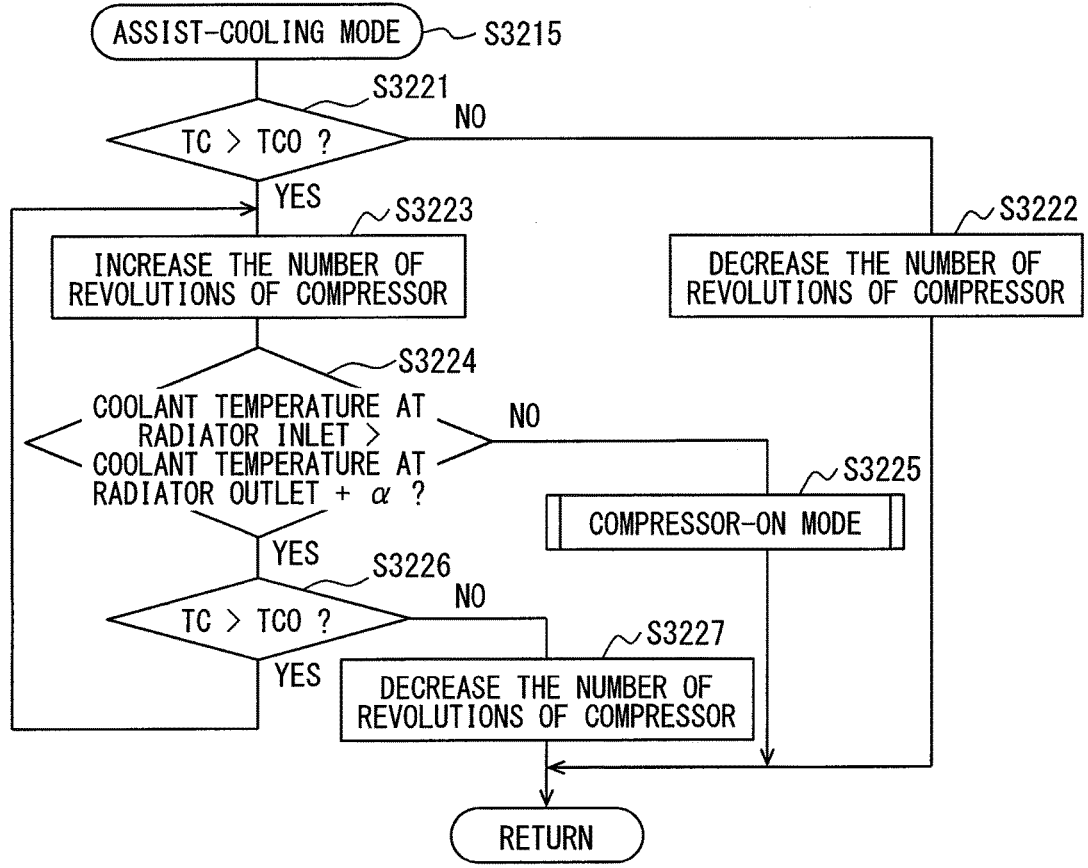
FIG. 13 is a flowchart showing control processing in an assist-cooling mode in the fifth embodiment.

FIG. 13 is a flowchart showing specific control processing in the assist cooling mode at step S3215. In step S3221, it is determined whether or not the surface temperature TC of the cooler core 16 exceeds the target temperature TCO of the cooler core 16.

When the surface temperature TC of the cooler core 16 is determined not to exceed the target temperature TCO of the cooler core 16 in step S3221, the operation proceeds to step S3222, in which the number of revolutions (refrigerant discharge capacity) of the compressor 32 is reduced by a predetermined amount. Thus, the power consumption of the compressor 32 can be reduced while keeping the surface temperature TC of the cooler core 16 at the target temperature TCO or lower of the cooler core 16.

On the other hand, when the surface temperature TC of the cooler core 16 is determined to exceed the target temperature TCO of the cooler core 16 in step S3221, the operation proceeds to step S3223, in which the number of revolutions (refrigerant discharge capacity) of the compressor 32 is increased by a predetermined amount, and then the operation proceeds to step S3224. Thus, the surface temperature TC of the cooler core 16 can be decreased to the target temperature TCO of the cooler core 16.

In step S3224, it is determined whether or not the coolant temperature at the coolant inlet of the radiator 13 exceeds the coolant temperature at the coolant outlet of the radiator 13 by a predetermined temperature a (0° C. in this example) or more. That is, it is determined whether or not the temperature of coolant having its heat exchanged at the cooler core 16 exceeds the outside-air temperature by the predetermined temperature a or more.

The coolant temperature at the coolant inlet of the radiator 13 can be calculated based on the outside-air temperature, the vehicle speed, the surface temperature TC of the cooler core 16, the flow rate of the coolant, and the like. The flow rate of coolant can be estimated from the driving force of the pump, the switching state of the switching valve, and the like. The coolant temperature at the coolant inlet of the radiator 13 may be directly detected.

When the coolant temperature at the coolant inlet of the radiator 13 is determined not to exceed the coolant temperature at the coolant outlet of the radiator 13 by the predetermined temperature a or more in step S3224, the cooling capacity of the cooler core 16 is determined to become insufficient in the assist cooling mode, and then the operation proceeds to step S3225, in which the compressor-on mode is selected.

In this way, the compressor 32 is operated (turned on), while allowing the coolant to circulate through between the cooler core 16 and the coolant cooler 14, which prevents the coolant from circulating between the cooler core 16 and the radiator 13, enhancing the cooling capacity of the cooler core 16.

On the other hand, when the coolant temperature at the coolant inlet of the radiator 13 is determined to exceed the coolant temperature at the coolant outlet of the radiator 13 by the predetermined temperature a or more in step S3224, the operation proceeds to step S3226, in which it is determined whether or not the surface temperature TC of the cooler core 16 exceeds the target temperature TCO of the cooler core 16.

When the surface temperature TC of the cooler core 16 is determined to exceed the target temperature TCO of the cooler core 16 in step S3226, the operation returns to step S3223. Thus, the number of revolutions (refrigerant discharge capacity) of the compressor 32 is increased by a predetermined amount, so that the surface temperature TC of the cooler core 16 can be reduced to the target temperature TCO of the cooler core 16.

On the other hand, when the surface temperature TC of the cooler core 16 is determined not to exceed the target temperature TCO of the cooler core 16 in step S3226, the operation proceeds to step S3227, in which the number of revolutions (refrigerant discharge capacity) of the compressor 32 is reduced by the predetermined amount. Thus, the power consumption of the compressor 32 can be reduced while keeping the surface temperature TC of the cooler core 16 at the target temperature TCO or lower of the cooler core 16.

In this embodiment, the first switching valve 21 and the second switching valve 22 are switchable to the assist cooling mode (third dehumidification mode). The assist cooling mode (third dehumidification mode) is an operation mode of allowing the coolant to circulate among the cooler core 16, the coolant cooler 14, and the radiator 13.

Thus, both the cold heat generated by the refrigeration cycle 31 and the cold heat from the outside air can be used to cool and dehumidify the air in the cooler core 16, thereby ensuring the cooling capacity and achieving power saving of the cooler core 16.

In this embodiment, the switching control unit 70b of the controller 70 switches from the compressor-on mode (first dehumidification mode) to the assist cooling mode (third dehumidification mode) and the compressor-off mode (second dehumidification mode) in this order as the outside-air temperature decreases. Thus, as the outside-air temperature is decreased, the usability of cold heat from the outside air can be enhanced, thereby further achieving the power saving.

In this embodiment, as explained in the description of steps S3221 to S3227, the switching control unit 70b of the controller 70 controls the flow rate of refrigerant flowing through the coolant cooler 14 such that the temperature of coolant having its heat exchanged at the cooler core 16 is higher than the outside-air temperature by the predetermined temperature or more in the assist cooling mode (third dehumidification mode).

Thus, in the assist cooling mode (third dehumidification mode), the cooling capacity of the coolant cooler 14 can be appropriately adjusted to effectively achieve power saving.

The switching control unit 70b of the controller 70 may control the flow rate of refrigerant flowing through the coolant cooler 14, or the flow rate of coolant or ventilation air flowing through the cooler core 16 such that the temperature of coolant having its heat exchanged at the cooler core 16 is higher than the outside-air temperature by the predetermined temperature or more in the assist cooling mode (third dehumidification mode).

Thus, in the assist cooling mode (third dehumidification mode), the cooling capacity of the coolant cooler 14 can be appropriately adjusted to effectively achieve power saving.

Sixth Embodiment

Figure 14:
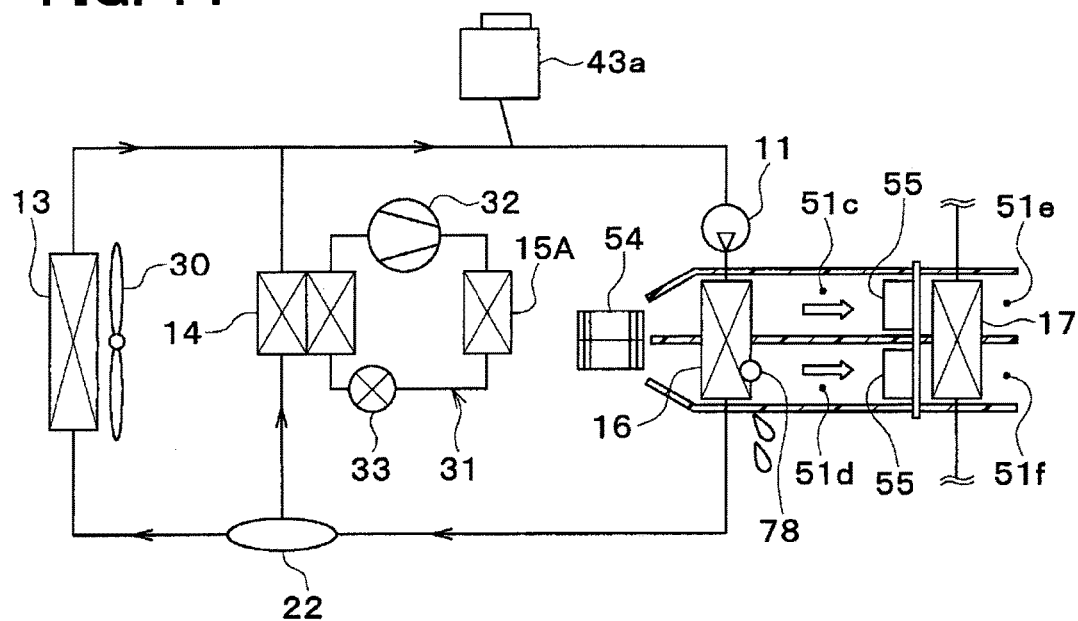
FIG. 14 is an entire configuration diagram of a vehicle thermal management system according to a sixth embodiment.

In this embodiment, as shown in FIG. 14, the interior air-conditioning unit 50 is configured of two-layered inside-outside air units that independently blows the inside air and the outside air into the vehicle interior. Specifically, the air passage in the casing 51 is partitioned into an outside air passage 51c and an inside air passage 51d.

The outside air passage 51c is a passage for flow of the outside air introduced from the inside/outside air switching case 52. The inside air passage 51d is a passage for the flow of the inside air introduced from the inside/outside air switching case 52.

The interior blower 54 is an electric blower that drives a first fan and a second fan by a common electric motor. The first fan blows the inside air introduced from the inside/outside air switching case 52 into the inside air passage 51d. The second fan blows the outside air introduced from the inside/outside air switching case 52 into the outside air passage 51c.

The outside air passage 51c communicates with a defroster air outlet 51e. The inside air passage 51d communicates with a foot air outlet 51f.

The cooler core 16 is disposed across the entire area of the outside air passage 51c and inside air passage 51d. A coolant-flow upstream side part of the cooler core 16 is disposed in the outside air passage 51c. A coolant-flow downstream side part of the cooler core 16 is disposed in the inside air passage 51d.

In other words, in the cooler core 16, the coolant flows from a side of the outside air passage 51c to a side of the inside air passage 51d. Thus, in the cooler core 16, the coolant has its temperature increased as it flows from the side of the outside air passage 51c to the side of the inside air passage 51d.

A heater core bypass passage is formed on the downstream side of the air flow in the cooler core 16 in each of the outside air passage 51c and the inside air passage 51d. The heater-core bypass passage is an air passage that allows the air having passed through the cooler core 16 to flow bypassing the heater core 17.

The air mix door 55 is independently disposed in each of the outside air passage 51c and the inside air passage 51d. Thus, the outside air passage 51c and the inside air passage 51d can independently adjust the temperatures of respective airs therein.

Since the outside air in the outside air passage 51c is blown out of the defroster air outlet 51e, relatively dry outside air can be blown out toward the window glass even in the compressor-off mode, thereby enabling prevention of window fogging.

The coolant-flow upstream side part of the cooler core 16 is disposed in the outside air passage 51c, so that the outside air in the outside air passage 51c can be cooled to a lower temperature, thereby enhancing the dehumidification capacity. Thus, window fogging can be prevented without operating the compressor 32.

The inside/outside air switching door 53 adjusts the ratio of the volume of the inside air to the outside air to be introduced into each of the outside air passage 51c and the inside air passage 51d, thereby switching the suction port mode among an inside-outside air two-layered mode, an entire inside-air mode, an entire outside-air mode, and an inside-outside air mixing mode.

The inside-outside air two-layered mode is a suction port mode in which the outside air is introduced into the outside air passage 51c, while the inside air is introduced into the inside air passage 51d. The entire inside-air mode is a suction port mode in which the inside air is introduced into both the outside air passage 51c and the inside air passage 51d. The entire outside-air mode is a suction port mode in which the outside air is introduced into both the outside air passage 51c and the inside air passage 51d. The inside-outside air mixing mode is a suction port mode in which the inside air and the outside air are introduced at a predetermined ratio therebetween into each of the outside air passage 51c and the inside air passage 51d.

The coolant-flow upstream side part of the cooler core 16 is disposed in the outside air passage 51c, so that the inside air passing through the outside air passage 51c can be cooled to a lower temperature, thereby enhancing the dehumidification capacity even in the entire inside-air mode. Thus, window fogging can be prevented without operating the compressor 32.

In the entire inside-air mode, the flow rate of coolant flowing through the cooler core 16 can be decreased, thereby enlarging a difference between the coolant temperature of the cooler core 16 in the outside air passage 51c and the coolant temperature of the cooler core 16 in the inside air passage 51d. As a result, a difference between the blowing temperature of the cooler core 16 in the outside air passage 51c and the blowing temperature of the cooler core 16 in the inside air passage 51d can be enlarged, thereby enhancing both the antifogging properties and warming feeling of the occupant.

In this embodiment, the cooler core 16 is disposed in the casing 51 to allow for passing of both the outside air in the outside air passage 51c and the inside air in the inside air passage 51d.

Thus, in the compressor-off mode (second dehumidification mode), the humidity of air blown toward the inner surface of the window glass of the vehicle can be reduced to further achieve power saving.

In this embodiment, the coolant-flow upstream side part of the cooler core 16 is disposed in the outside air passage 51c.

Thus, since the coolant can flow at as low temperature as possible through the part of the cooler core 16 disposed in the outside air passage 51c, the humidity of air blown toward the inner surface of the vehicle window glass can be reduced as much as possible. As a result, window fogging can be suppressed to the utmost.

Thus, since the coolant can flow at as high temperature as possible through the part of the cooler core 16 disposed in the inside air passage 51d, the temperature of air blown toward the feet of the occupant can be increased to the utmost. As a result, the occupant's warming feeling can be enhanced as highly as possible.

When the inside/outside air switching door 53 increases the rate of inside air introduced into the outside air passage 51c (for example, when switched to the entire inside-air mode), the pump control unit 70a of the controller 70 may decrease the flow rate of coolant flowing through the cooler core 16.

Thus, since the temperature of coolant flowing through the part of the cooler core 16 disposed in the inside air passage 51d can be increased, the temperature of air blown toward the feet of the occupant can be increased. As a result, the occupant's warming feeling can be enhanced.

Seventh Embodiment

Figure 15:
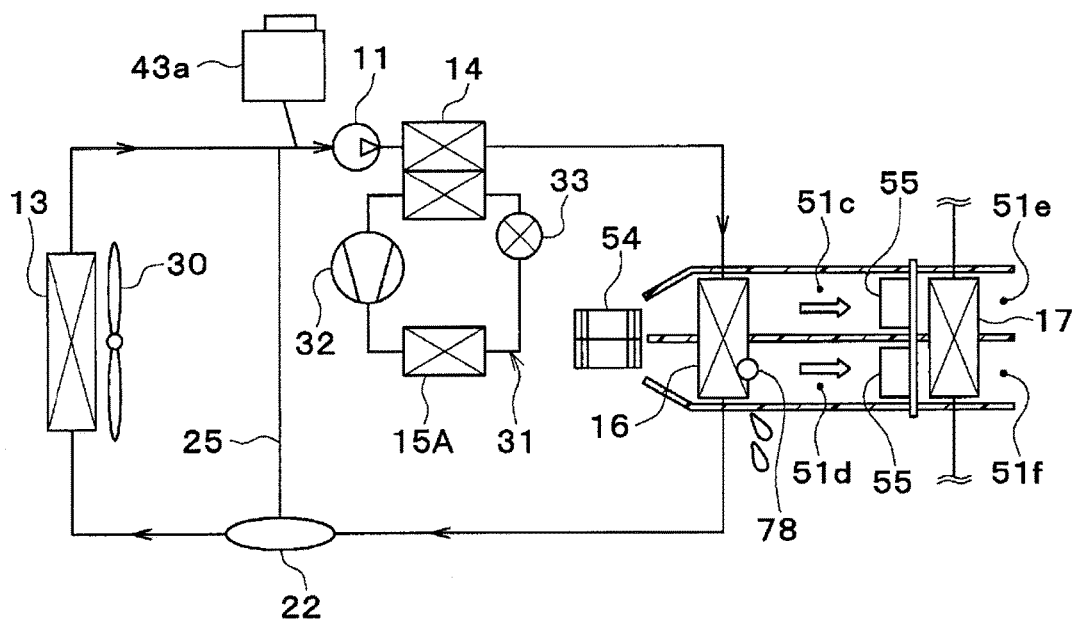
FIG. 15 is an entire configuration diagram of a vehicle thermal management system according to a seventh embodiment.

Although in the above-mentioned sixth embodiment, the radiator 13 is disposed in parallel to the chiller 14 with respect to the coolant flow, in this embodiment, as shown in FIG. 15, the radiator 13 is disposed in series to the chiller 14 with respect to the coolant flow.

In an example shown in FIG. 15, a bypass flow path 25 is disposed in the low-temperature side coolant circuit. The bypass flow path 25 is a flow path through which the coolant flows bypassing the radiator 13.

Eighth Embodiment

Figure 16:
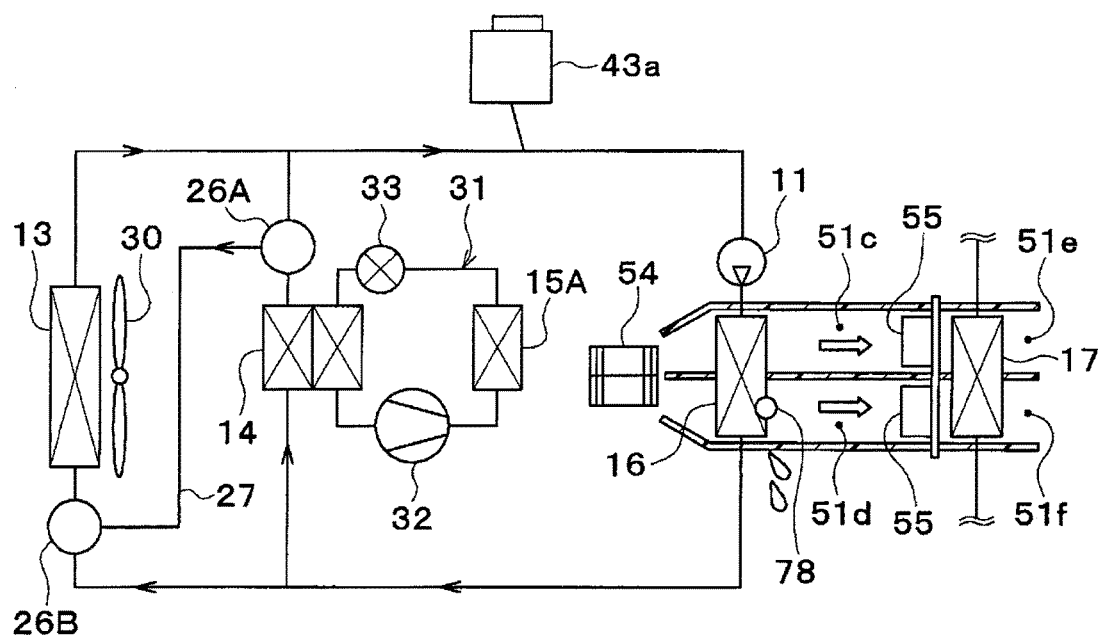
FIG. 16 is an entire configuration diagram of a vehicle thermal management system according to an eighth embodiment.

In the sixth embodiment, the radiator 13 is disposed in parallel to the chiller 14 with respect to the coolant flow. In the seventh embodiment, the radiator 13 is disposed in series to the chiller 14 with respect to the coolant flow. On the other hand, in this embodiment, as shown in FIG. 16, the radiator 13 can be switched between in series and in parallel to the chiller 14 with respect to the coolant flow.

Specifically, three-way valves 26A and 26B are disposed on the coolant outlet side of the chiller 14 and the coolant inlet side of the radiator 13, respectively.

The two three-way valves 26A and 26B are connected to a connection flow path 27. When the two three-way valves 26A and 26B close the connection flow path 27, the coolant flows in parallel through the chiller 14 and the radiator 13. When the two three-way valves 26A and 26B open the connection flow path 27, the coolant flows in series through the chiller 14 and the radiator 13.

Ninth Embodiment

Figure 17:
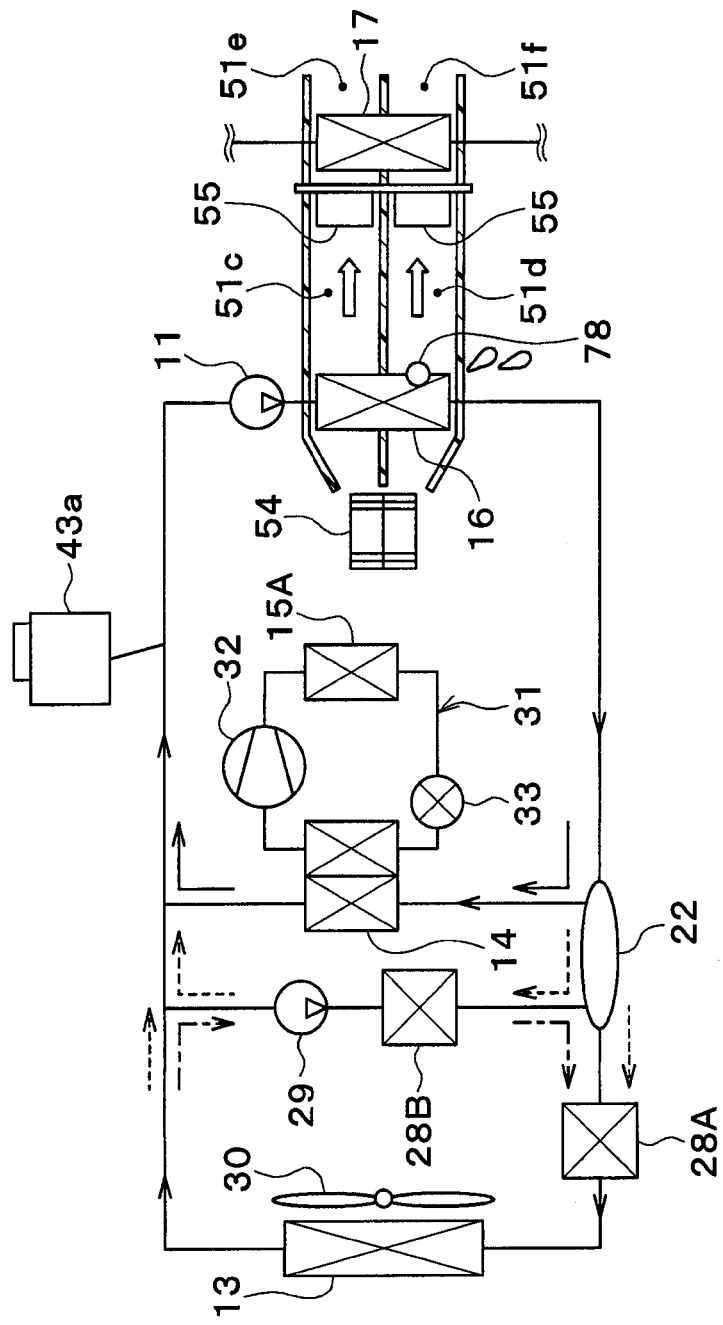
FIG. 17 is an entire configuration diagram of a vehicle thermal management system according to a ninth embodiment.

In this embodiment, as shown in FIG. 17, devices 28A and 28B to be cooled are disposed in the coolant circuit. The devices 28A and 28B to be cooled are devices that generate heat during operation, such as an inverter, a battery-temperature adjustment heat exchanger, a water-cooled intercooler, and a water-cooled turbocharger.

The first device 28A to be cooled is connected to the coolant inlet side of the radiator 13. The second device 28B to be cooled is disposed in parallel to the chiller 14 with respect to the coolant flow. The radiator pump 29 is disposed in series to the second device 28B to be cooled with respect to the coolant flow.

The radiator pump 29 is an electric pump for drawing and discharging the coolant (heat medium).

The second switching valve 22 switches between a device cooperative mode for circulation of the coolant as indicated by a solid arrow and a dashed arrow in FIG. 17 and a device independent mode for circulation of the coolant as indicated by a solid arrow and an alternate long and short dashed arrow in FIG. 17.

In the device cooperative mode, the coolant discharged from the first pump 11 circulates through all the cooler core 16, the chiller 14, the radiator 13, and the devices 28A and 28B to be cooled.

In the device independent mode, the coolant discharged from the first pump 11 circulates through the cooler core 16 and the chiller 14, and the coolant discharged from the radiator pump 29 circulates through the radiator 13 and the devices 28A and 28B to be cooled.

Figure 18:
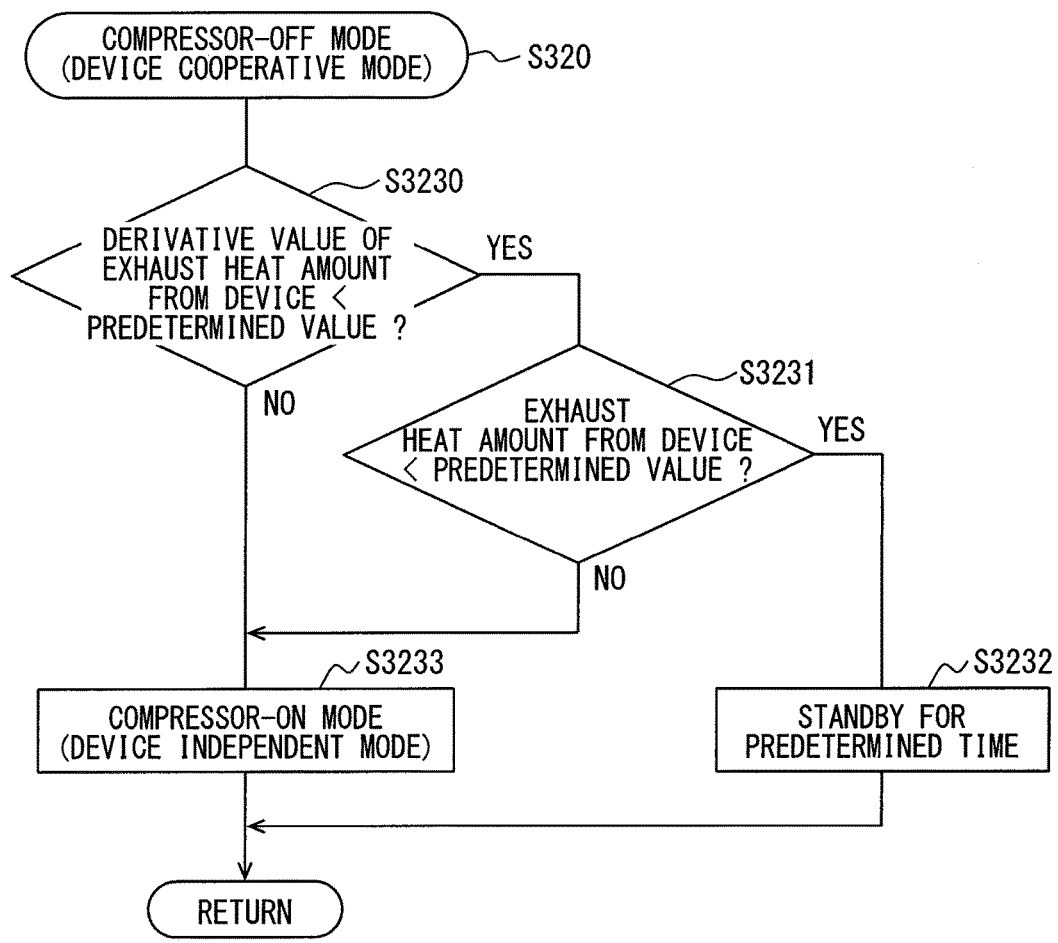
FIG. 18 is a flowchart showing control processing in a compressor-off mode in the ninth embodiment.

In this embodiment, in the compressor-off mode (second dehumidification mode), the second switching valve 22 switches to the device cooperative mode, and the controller 70 executes control processing shown in the flowchart of FIG. 18.

In step S3230, it is determined whether a derivative value of the amount of exhaust heat from the devices 28A and 28B to be cooled is below a predetermine value or not. In other words, it is determined whether the amount of exhaust heat from the devices 28A and 28B to be cooled drastically increases or not. For example, when a rate of increase of the temperature of the coolant exceeds the predetermined value, the amount of exhaust heat from the devices 28A and 28B to be cooled can be determined to be drastically increased.

When the derivative value of the amount of exhaust heat from the devices 28A and 28B to be cooled is determined to be below the predetermine value, the operation proceeds to step S3231, in which it is determined whether or not the amount of exhaust heat from the devices 28A and 28B to be cooled is below a predetermined value. When the amount of exhaust heat from the devices 28A and 28B to be cooled is determined to be below the predetermined value, the operation proceeds to step S3232, in which the thermal management system is on standby for a predetermined time. Thereafter, the operation is returned to step S3230.

On the other hand, when the derivative value of the amount of exhaust heat from the devices 28A and 28B to be cooled is determined not to be below the predetermined value in step S3230, or when the amount of exhaust heat from the devices 28A and 28B to be cooled is determined not to be below the predetermined value in step S3231, the operation proceeds to step S3233. In step S3233, the compressor-on mode is selected and the device independent mode is selected, whereby the devices 28A and 28B to be cooled are adapted to be cooled by the radiator 13.

Thus, even when the cooling capacity required to cool the devices 28A and 28B to be cooled is increased, the cooling and dehumidifying capacity for the air to be blown into the vehicle interior can be ensured while retaining the cooling capacities of the devices 28A and 28B to be cooled.

In steps S3230 and S3231, the temperature of coolant may be used instead of the amount of exhaust heat from the devices 28A and 28B to be cooled.

In this embodiment, as explained in the description of steps S3231 and S3233, the switching control unit 70b of the controller 70 controls the operations of the first and second switching valves 21 and 22 to switch to the compressor-on mode (first dehumidification mode) when the amount of heat discharged from the devices 28A and 28B to be cooled into the coolant exceeds a predetermined heat amount, or when the coolant temperature exceeds a predetermined temperature in the compressor-off mode (second dehumidification mode).

With this arrangement, when the cooling capacity required to cool the devices 28A and 28B to be cooled is increased, the compressor 32 is operated to use cold heat generated in the refrigeration cycle 31, which can prevent shortage of the cooling capacity of the devices 28A and 28B to be cooled and the cooling and dehumidifying capacity thereof for air to be blown into the vehicle interior.

In this embodiment, in the compressor-off mode (second dehumidification mode), the rate of increase of the temperature of the coolant (in other words, a derivative value of the heat amount discharged from the devices 28A and 28B to be cooled into the coolant) sometimes exceeds the predetermined value, or a derivative value of the coolant temperature exceeds a predetermined value. In this case, as explained in the description of the steps S3230 and S3233, the switching control unit 70b of the controller 70 controls the operations of the first and second switching valves 21 and 22 to switch to the first dehumidification mode.

With this arrangement, when the cooling capacity required to cool the devices 28A and 28B to be cooled is drastically increased, the compressor 32 is operated to use cold heat generated in the refrigeration cycle 31, which can prevent shortage of the cooling capacity of the devices 28A and 28B to be cooled and the cooling and dehumidifying capacity thereof for air to be blown into the vehicle interior.

Other Embodiments

The above-mentioned embodiments can be appropriately combined together. Further, various modifications and changes can be made to these embodiments described above, for example, as follows.

(1) In the above-mentioned embodiments, the operation of the exterior blower 30 is controlled to adjust the flow rate of the outside air flowing through the radiator 13. Alternatively, the operation of a radiator shutter (not shown) may be controlled to adjust the flow rate of the outside air flowing through the radiator 13. The radiator shutter is an outside air passage opening/closing portion for opening and closing a passage through which the outside air flows. The fan of the exterior blower 30 may be rotated in the reverse direction, thus limiting the flow rate of the outside air.

(2) Although in each of the above-mentioned embodiments, the coolant is used as the heat medium for adjusting the temperature of a temperature-adjustment target device, various kinds of media, such as oil, may be used as the heat medium.

Alternatively, nanofluid may be used as the heat medium. The nanofluid is a fluid containing nanoparticles having a diameter of the order of nanometer. By mixing the nanoparticles into the heat medium, the following actions and effects can be obtained, in addition to an action and effect of decreasing a freezing point, like a coolant (so-called antifreeze) using ethylene glycol.

That is, the use of the nanofluid can exhibit actions and effects of improving a thermal conductivity in a specific temperature range, increasing a thermal capacity of the heat medium, preventing the corrosion of a metal pipe and the degradation of a rubber pipe, and enhancing the fluidity of the heat medium at an ultralow temperature.

These actions and effects are varied depending on the configuration, shape, and blending ratio of the nanoparticles, and additive material.

Thus, the use of the nanofluid can improve its thermal conductivity, and thus even in a small amount, can exhibit the substantially same cooling efficiency as that of the coolant using ethylene glycol.

Further, such a heat medium can also improve its thermal capacity and increase a cold storage amount (cold storage due to its sensible heat) of the heat medium itself.

By increasing the cold storage amount, the cooling and heating temperatures of a device using the cold storage can be adjusted for some time period even though the compressor 32 is not operated, which can lead to power saving in the vehicle thermal management system 10.

An aspect ratio of the nanoparticle is preferably 50 or more. This is because such an aspect ratio can provide the adequate thermal conductivity. Note that the aspect ratio of the nanoparticle is a shape index indicating the ratio of the width to the height of the nanoparticle.

Nanoparticles suitable for use can include any one of Au, Ag, Cu, and C. Specifically, atoms configuring the nanoparticles can include an Au nanoparticle, an Ag nanowire, a carbon nanotube (CNT), a graphene, a graphite core-shell nanoparticle (a particle body with the above-mentioned atom surrounded by a structure, such as a carbon nanotube), an Au nanoparticle-containing CNT, and the like.

(3) In the refrigeration cycle 31 of each of the embodiments, fluorocarbon refrigerant is used as the refrigerant. However, the kind of refrigerant is not limited thereto, and may be natural refrigerant, such as carbon dioxide, a hydrocarbon refrigerant, and the like.

The refrigeration cycle 31 in each of the above-mentioned embodiments constitutes a subcritical refrigeration cycle in which its high-pressure side refrigerant pressure does not exceed the critical pressure of the refrigerant, but may constitute a super-critical refrigeration cycle in which its high-pressure side refrigerant pressure exceeds the critical pressure of the refrigerant.

(4) Although in the above-mentioned first embodiment, the coolant discharged from the first pump 11 or second pump 12 exchanges heat with the engine coolant in the engine cooling circuit 60 via the coolant-to-coolant heat exchanger 18, the coolant discharged from the first pump 11 or second pump 12 may circulate through the engine cooling circuit 60 via a flow-path switching valve.

In the embodiment, the coolant flow path of the engine 61 constitutes an engine heat transfer portion that transfers heat between the engine 61 and the coolant.

The flow-path switching valve is a switching device that switches the coolant discharged from the first pump 11 or second pump 12 between a state in which the coolant circulates through the engine cooling circuit 60 and a state in which the coolant does not circulate therethrough.

(5) Although in the above-mentioned embodiments, the inverter 19 is provided as the heat generating device, various heat generating devices other than or in addition to the inverter 19 may be provided. Other examples of the heat generating device include a traveling electric motor, various engine components, and the like.

Various engine components can include a turbocharger, an intercooler, an EGR cooler, a CVT warmer, a CVT cooler, an exhaust-heat recovery device, and the like.

The turbocharger is a supercharger that supercharges intake air of the engine (intake). The intercooler is an intake cooler (intake-to-heat medium heat exchanger) that cools a supercharged intake by exchanging heat between the coolant and the supercharged intake at a high temperature compressed by the turbocharger.

The EGR cooler is an exhaust gas-to-coolant heat exchanger (exhaust air-to-heat medium heat exchanger) that cools exhaust air by exchanging heat between the coolant and an engine exhaust gas (exhaust air) to be returned to the intake side of the engine.

The continuously variable transmission (CVT) warmer is a lubricating oil-coolant heat exchanger (lubricating oil-to-heat medium heat exchanger) that heats a lubricating oil (CVT oil) by exchanging heat between the coolant and the CVT oil for lubricating the CVT.

The CVT cooler is a lubricating oil-coolant heat exchanger (lubricating oil-heat medium heat exchanger) that cools the CVT oil by exchanging heat between the CVT oil and the coolant.

The exhaust-heat recovery device is an exhaust air-to-coolant heat exchanger (exhaust air-heat medium heat exchanger) that exchanges heat between the exhaust air and the coolant, thereby absorbing heat from the exhaust air into the coolant.

(6) In the compressor-off mode of the above first embodiment, the flow rate of coolant flowing through the radiator 13 and the flow rate of coolant flowing through the cooler core 16 are increased when the window fogging index RHW increases, while the flow rate of coolant flowing through the radiator 13 and the flow rate of coolant flowing through the cooler core 16 are decreased when the window fogging index RHW decreases. Alternatively, when the window fogging index RHW increases, the volume of air blown from the defroster air outlet may be increased, while when the window fogging index RHW decreases, the volume of air blown from the defroster air outlet may be decreased.

Although in the above embodiments, the controller 70 calculates the window fogging index RHW based on a detection signal from the composite sensor 88 and the like, the window fogging index RHW may be calculated based on a detection signal from another sensor.

For example, the surface temperature of the windshield may be estimated and calculated from the outside-air temperature, the solar radiation amount, the interior air temperature, the glass heat conductivity or reflectivity (preset value), and the vehicle speed.

For example, the temperature of inside air in the vicinity of the windshield may be estimated and calculated from the inside-air temperature, and an air outlet mode and a blown-air temperature (estimated value) of the interior air-conditioning unit 50. For example, the humidity of the inside air in the vicinity of the windshield may be constantly regarded as 100%.

For example, a coolant side capacity may be calculated from a difference in temperature between the coolant inlet and coolant outlet of the cooler core 16; an air side capacity may be calculated from the suction-air temperature of the cooler core 16, the volume of air from the interior blower 54, and the surface temperature of the cooler core 16; a condensation latent heat amount of moisture in the air may be calculated from a difference between the coolant-side capacity and the air-side capacity of the cooler core 16; and the humidity of the inside air in the vicinity of the windshield may be estimated and calculated by assuming that the relative humidity at the outlet of the cooler core is 100%.

The volume of air from the interior blower 54 can be estimated from the driven state of the interior blower 54. The blown air temperature of the cooler core 16 may be used instead of the surface temperature of the cooler core 16.

What is claimed is:

1. An air conditioner for a vehicle, comprising:
    a pump drawing and discharging a heat medium to circulate the heat medium;
    an air-cooling heat exchanger that exchanges sensible heat between the heat medium circulating by the pump and ventilation air to be blown into a vehicle interior to cool and dehumidify the ventilation air;
    a heat-medium and outside-air heat exchanger that exchanges sensible heat between the heat medium and outside air;
    a compressor adapted to draw and discharge a refrigerant in a refrigeration cycle;
    a heat-medium cooling heat exchanger that cools the heat medium by exchanging heat between a low-pressure side refrigerant in the refrigeration cycle and the heat medium;
    a dehumidification mode switching valve that switches between a first dehumidification mode in which the heat medium circulates between the air-cooling heat exchanger and the heat-medium cooling heat exchanger, and a second dehumidification mode in which the heat medium circulates between the air-cooling heat exchanger and the heat-medium and outside-air heat exchanger; and
    a controller configured to allow the heat medium to circulate between the air-cooling heat exchanger and the heat-medium and outside-air heat exchanger when a temperature in connection with a temperature of the outside air is estimated or determined to be less than a temperature in connection with a dew-point temperature of the ventilation air flowing into the air-cooling heat exchanger.

2. The air conditioner for a vehicle according to claim 1, further comprising:
    a detector adapted to detect at least one of a temperature of an inside air, a humidity of the inside air, a temperature of the outside air, a temperature of the heat medium, and a temperature of a window glass; and
    a switching controller configured to control an operation of the dehumidification mode switching valve based on a detection result by the detector.

3. The air conditioner for a vehicle according to claim 2, wherein
    the switching controller controls the operation of the dehumidification mode switching valve to switch to the second dehumidification mode when a temperature in connection with the temperature of the outside air is less than a temperature in connection with a dew-point temperature of the ventilation air flowing into the air-cooling heat exchanger.

4. The air conditioner for a vehicle according to claim 1, further comprising
    a flow-rate adjuster configured to adjust at least one of a flow rate of the heat medium flowing through the heat-medium and outside-air heat exchanger, a flow rate of the outside air flowing through the heat-medium and outside-air heat exchanger, and a flow rate of the heat medium flowing through the air-cooling heat exchanger.

5. The air conditioner for a vehicle according to claim 2, further comprising:
    a flow-rate adjuster configured to adjust at least one of a flow rate of the heat medium flowing through the heat-medium and outside-air heat exchanger, a flow rate of the outside air flowing through the heat-medium and outside-air heat exchanger, and a flow rate of the heat medium flowing through the air-cooling heat exchanger; and a flow-rate controller configured to control an operation of the flow-rate adjuster such that a temperature in connection with a temperature of the ventilation air blown from the air-cooling heat exchanger approaches a target temperature in the second dehumidification mode.

6. The air conditioner for a vehicle according to claim 5, wherein
in the second dehumidification mode, the flow-rate controller controls an operation of the flow-rate adjustment portion such that the at least one flow rate is increased as the temperature of the outside air increases.

7. The air conditioner for a vehicle according to claim 6, wherein
the switching controller controls an operation of the dehumidification mode switching valve to switch to the first dehumidification mode after the flow-rate controller increases the at least one flow rate by a predetermined flow rate or more in the second dehumidification mode.

8. The air conditioner for a vehicle according to claim 6, wherein
the switching controller controls the operation of the dehumidification mode switching valve to switch to the first dehumidification mode when the temperature in connection with the temperature of the ventilation air blown from the air-cooling heat exchanger exceeds the target temperature even after the flow-rate controller increases the at least one flow rate by a predetermined flow rate or more in the second dehumidification mode.

9. The air conditioner for a vehicle according to claim 5, further comprising:
a window-fogging-index calculator configured to calculate a window fogging index as an index for a risk degree of window fogging based on the temperature of the inside air, the humidity of the inside air, and the temperature of the window glass, wherein
in the second dehumidification mode, the flow-rate controller controls the operation of the flow-rate adjuster based on the window fogging index calculated by the window-fogging-index calculator.

10. The air conditioner for a vehicle according to claim 5, further comprising:
a dew-point temperature calculator configured to calculate a dew-point temperature at the window glass based on the temperature of the inside air, the humidity of the inside air, and the temperature of the window glass, wherein
in the second dehumidification mode, the flow-rate controller controls the operation of the flow-rate adjuster such that the at least one flow rate is increased as a difference obtained by subtracting the dew-point temperature from a temperature of the window glass decreases.

11. The air conditioner for a vehicle according to claim 1, further comprising:
an inside/outside air rate adjuster configured to adjust respective rates of inside air and outside air in the ventilation air, wherein
the inside/outside air rate adjuster and the dehumidification mode switching valve are capable of switching to a dehumidification-stopping mode in which the rate of the outside air in the ventilation air is equal to or more than a predetermined rate, and the heat medium does not circulate through the air-cooling heat exchanger.

12. The air conditioner for a vehicle according to claim 11, further comprising:
a switching controller configured to control an operation of the dehumidification mode switching valve to switch to the dehumidification-stopping mode when a temperature of the outside air is less than a predetermined temperature.

13. The air conditioner for a vehicle according to claim 11, further comprising:
a switching controller configured to control an operation of the dehumidification mode switching valve to switch to the second dehumidification mode when a temperature of the ventilation air drawn into the air-cooling heat exchanger is higher than a temperature in connection with a temperature of the outside air by a predetermined temperature or more in the dehumidification-stopping mode.

14. The air conditioner for a vehicle according to claim 1, further comprising:
a switching controller configured to control an operation of the dehumidification mode switching valve to switch to the second dehumidification mode when a temperature of the outside air is less than a predetermined temperature.

15. The air conditioner for a vehicle according to claim 1, further comprising:
a switching controller configured to control an operation of the dehumidification mode switching valve to cool and dehumidify the ventilation air in the second dehumidification mode when a pressure of the refrigeration cycle is estimated, determined, or detected to be less than a predetermined value in intending to cool and dehumidify the ventilation air.

16. The air conditioner for a vehicle according to claim 1, further comprising:
an inside/outside air rate adjuster configured to adjust respective rates of inside air and outside air in the ventilation air; and
a switching controller configured to control an operation of the dehumidification mode switching valve to switch to the second dehumidification mode when the rate of the inside air in the ventilation air is equal to or more than a predetermined rate.

17. The air conditioner for a vehicle according to claim 1, further comprising:
an inside/outside air rate adjuster configured to adjust respective rates of inside air and outside air in the ventilation air;
an operation switch configured to output a command for setting the rate of the inside air in the ventilation air to a predetermined rate or more when being operated by an occupant; and
a switching controller configured to control an operation of the dehumidification mode switching valve to switch to the second dehumidification mode when the operation portion is operated by the occupant, and a temperature of the outside air is less than a predetermined temperature.

18. The air conditioner for a vehicle according to claim 1, further comprising:
an inside/outside air rate adjuster configured to adjust respective rates of inside air and outside air in the ventilation air; and
the controller is configured to control an operation of the inside/outside air rate adjuster to increase the rate of the outside air in the ventilation air when a vehicle speed is higher than a predetermined speed in the second dehumidification mode.

19. The air conditioner for a vehicle according to claim 1, further comprising:
an inside/outside air rate adjuster configured to adjust respective rates of inside air and outside air in the ventilation air; and
the controller is configured to control an operation of the inside/outside air rate adjuster such that as a flow rate of the heat medium in the air-cooling heat exchanger decreases, or as a flow rate of the heat medium in the heat-medium and outside-air heat exchanger decreases, the rate of the outside air in the ventilation air is increased in the second dehumidification mode.

20. The air conditioner for a vehicle according to claim 1, further comprising:
an inside/outside air rate adjuster configured to adjust respective rates of inside air and outside air in the ventilation air; and
the controller is configured to control an operation of the inside/outside air rate adjuster to increase the rate of the outside air in the ventilation air depending on a decrease in temperature of the outside air in the second dehumidification mode.

21. An air conditioner for a vehicle according to claim 1, further comprising:
a device to be cooled that is cooled by discharging heat to the heat medium; and
a switching controller configured to control an operation of the dehumidification mode switching valve to switch to the first dehumidification mode when an amount of heat discharged to the heat medium from the device to be cooled exceeds a predetermined heat amount, when a temperature of the heat medium exceeds a predetermined temperature, or when a rate of increase of the temperature of the heat medium exceeds a predetermined value in the second dehumidification mode.

22. The air conditioner for a vehicle according to claim 1, wherein the dehumidification mode switching valve is configured to enable switching to a third dehumidification mode in which the heat medium circulates among the air-cooling heat exchanger, the heat-medium cooling heat exchanger, and the heat-medium and outside-air heat exchanger.

23. The air conditioner for a vehicle according to claim 22, further comprising:
a switching controller configured to control an operation of the dehumidification mode switching valve in such a manner as to switch to the first dehumidification mode, the third dehumidification mode, and the second dehumidification mode in this order as a temperature of the outside air decreases.

24. The air conditioner for a vehicle according to claim 22, further comprising:
a flow-rate controller configured to control a flow rate of the refrigerant flowing through the heat-medium cooling heat exchanger or a flow rate of the heat medium or ventilation air flowing through the air-cooling heat exchanger such that a temperature of the heat medium having a heat exchanged at the air-cooling heat exchanger is higher than a temperature of the outside air by a predetermined temperature or more in the third dehumidification mode.

25. The air conditioner for a vehicle according to claim 1, further comprising:
a casing that forms an outside air passage for outside air to flow toward an inner surface of a vehicle window glass and an inside air passage for inside air to flow toward a foot area of an occupant, wherein
the air-cooling heat exchanger is disposed in the casing such that both the outside air in the outside air passage and the inside air in the inside air passage pass through the air-cooling heat exchanger.

26. The air conditioner for a vehicle according to claim 25, wherein
a part of the air-cooling heat exchanger positioned on an upstream side of a heat medium flow is disposed in the outside air passage.

27. An air conditioner for a vehicle, comprising:
a pump drawing and discharging a heat medium to circulate the heat medium;
an air-cooling heat exchanger that exchanges sensible heat between the heat medium circulating by the pump and ventilation air to be blown into a vehicle interior to cool and dehumidify the ventilation air;
a heat-medium and outside-air heat exchanger that exchanges sensible heat between the heat medium and outside air;
a compressor adapted to draw and discharge a refrigerant in a refrigeration cycle;
a heat-medium cooling heat exchanger that cools the heat medium by exchanging heat between a low-pressure side refrigerant in the refrigeration cycle and the heat medium;
a dehumidification mode switching valve that switches between a first dehumidification mode in which the heat medium circulates between the air-cooling heat exchanger and the heat-medium cooling heat exchanger, and a second dehumidification mode in which the heat medium circulates between the air-cooling heat exchanger and the heat-medium and outside-air heat exchanger;
a window-fogging-index calculator configured to calculate a window fogging index as an index for a risk degree of window fogging based on a temperature of inside air, a humidity of the inside air, and a temperature of the window glass; and
a switching controller configured to control an operation of the dehumidification mode switching valve based on the window fogging index calculated by the window-fogging-index calculator.

28. An air conditioner for a vehicle, comprising:
a pump drawing and discharging a heat medium to circulate the heat medium;
an air-cooling heat exchanger that exchanges sensible heat between the heat medium circulating by the pump and ventilation air to be blown into a vehicle interior to cool and dehumidify the ventilation air;
a heat-medium and outside-air heat exchanger that exchanges sensible heat between the heat medium and outside air;
a compressor adapted to draw and discharge a refrigerant in a refrigeration pm;
a heat-medium cooling heat exchanger that cools the heat medium by exchanging heat between a low-pressure side refrigerant in the refrigeration cycle and the heat medium;
a dehumidification mode switching valve that switches between a first dehumidification mode in which the heat medium circulates between the air-cooling heat exchanger and the heat-medium cooling heat exchanger, and a second dehumidification mode in which the heat medium circulates between the air-cooling heat exchanger and the heat-medium and outside-air heat exchanger; and a dew-point temperature calculator configured to calculate a dew-point temperature at a window glass based on a temperature of inside air, a humidity of the inside air, and a temperature of the window glass, wherein in the second dehumidification mode, a switching controller is configured to control an operation of the dehumidification mode switching valve based on a difference obtained by subtracting the dew-point temperature from the temperature of the window glass.

29. An air conditioner for a vehicle, comprising: a pump drawing and discharging a heat medium to circulate the heat medium;

an air-cooling heat exchanger that exchanges sensible heat between the heat medium circulating by the pump and ventilation air to be blown into a vehicle interior to cool and dehumidify the ventilation air;

a heat-medium and outside-air heat exchanger that exchanges sensible heat between the heat medium and outside air;

a compressor adapted to draw and discharge a refrigerant in a refrigeration cycle;

a heat-medium cooling heat exchanger that cools the heat medium by exchanging heat between a low-pressure side refrigerant in the refrigeration cycle and the heat medium;

a dehumidification mode switching valve that switches between a first dehumidification mode for circulation of the heat medium between the air-cooling heat exchanger and the heat-medium cooling heat exchanger, and a second dehumidification mode for circulation of the heat medium between the air-cooling heat exchanger and the heat-medium and outside-air heat exchanger;

an inside/outside air switching door that switches between an inside-air introduction mode of introducing inside air into the air-cooling heat exchanger and an outside-air introduction mode of introducing outside air into the air-cooling heat exchanger;

a pump failure detector configured to detect failure of the pump; and an inside/outside air switching controller configured to control an operation of the inside/outside air switching door to switch to the outside-air introduction mode when the pump failure detector detects failure of the pump.

30. An air conditioner for a vehicle, comprising:
a pump drawing and discharging a heat medium to circulate the heat medium;

an air-cooling heat exchanger that exchanges sensible heat between the heat medium circulating by the pump and ventilation air to be blown into a vehicle interior to cool and dehumidify the ventilation air;

a heat-medium and outside-air heat exchanger that exchanges sensible heat between the heat medium and outside air;

a compressor adapted to draw and discharge a refrigerant in a refrigeration cycle;

a heat-medium cooling heat exchanger that cools the heat medium by exchanging heat between a low-pressure side refrigerant in the refrigeration cycle and the heat medium;

a dehumidification mode switching valve that switches between a first dehumidification mode for circulation of the heat medium between the air-cooling heat exchanger and the heat-medium cooling heat exchanger, and a second dehumidification mode for circulation of the heat medium between the air-cooling heat exchanger and the heat-medium and outside-air heat exchanger;

a second pump adapted to draw and discharge the heat medium;

an air-heating heat exchanger that heats the ventilation air by exchanging sensible heat between the heat medium discharged from the second pump and the ventilation air;

a compressor failure detector configured to detect failure of the compressor;

a circulation switching valve that switches between a first circulation state in which the heat medium discharged from the pump circulates between the heat-medium and outside-air heat exchanger and a coolant-to-coolant heat exchanger, and a second circulation state in which the heat medium discharged from the second pump circulates between the air-heating heat exchanger and the coolant-to-coolant heat exchanger; and a circulation switching controller configured to control an operation of the circulation switching valve to switch to the second circulation state when the compressor failure detector detects failure of the compressor in the first dehumidification mode.

31. An air conditioner for a vehicle, comprising:
a pump drawing and discharging a heat medium to circulate the heat medium;

an air-cooling heat exchanger that exchanges sensible heat between the heat medium circulating by the pump and ventilation air to be blown into a vehicle interior to cool and dehumidify the ventilation air;

a heat-medium and outside-air heat exchanger that exchanges sensible heat between the heat medium and outside air;

a compressor adapted to draw and discharge a refrigerant in a refrigeration cycle;

a heat-medium cooling heat exchanger that cools the heat medium by exchanging heat between a low-pressure side refrigerant in the refrigeration cycle and the heat medium;

a dehumidification mode switching valve that switches between a first dehumidification mode in which the heat medium circulates between the air-cooling heat exchanger and the heat-medium cooling heat exchanger, and a second dehumidification mode in which the heat medium circulates between the air-cooling heat exchanger and the heat-medium and outside-air heat exchanger; and an operation switch configured to output a command for switching from the first dehumidification mode to the second dehumidification mode when being operated by an occupant.

32. An air conditioner for a vehicle; comprising:
a pump drawing and discharging a heat medium to circulate the heat medium;

an air-cooling heat exchanger that exchanges sensible heat between the heat medium circulating by the pump and ventilation air to be blown into a vehicle interior to cool and dehumidify the ventilation air;

a heat-medium and outside-air heat exchanger that exchanges sensible heat between the heat medium and outside air;

a compressor adapted to draw and discharge a refrigerant in a refrigeration cycle;

a heat-medium cooling heat exchanger that cools the heat medium by exchanging heat between a low-pressure side refrigerant in the refrigeration cycle and the heat medium;

a dehumidification mode switching valve that switches between a first dehumidification mode in which the heat medium circulates between the air-cooling heat exchanger and the heat-medium cooling heat exchanger; and a second dehumidification mode in which the heat medium circulates between the air-cooling heat exchanger and the heat-medium and outside-air heat exchanger; and a switching controller configured to control an operation of the dehumidification mode switching valve to allow the heat medium to flow bypassing the heat-medium cooling heat exchanger when a temperature in connection with a temperature of the refrigerant in the heat-medium cooling heat exchanger is higher than a temperature in connection with the temperature of the heat medium flowing through the air-cooling heat exchanger.

33. An air conditioner for a vehicle; comprising:

a pump drawing and discharging a heat medium to circulate the heat medium;

an air-cooling heat exchanger that exchanges sensible heat between the heat medium circulating by the pump and ventilation air to be blown into a vehicle interior to cool and dehumidify the ventilation air;

a heat-medium and outside-air heat exchanger that exchanges sensible heat between the heat medium and outside air;

a compressor adapted to draw and discharge a refrigerant in a refrigeration cycle;

a heat-medium cooling heat exchanger that cools the heat medium by exchanging heat between a low-pressure side refrigerant in the refrigeration cycle and the heat medium;

a dehumidification mode switching valve that switches between a first dehumidification mode in which the heat medium circulates between the air-cooling heat exchanger and the heat-medium cooling heat exchanger, and a second dehumidification mode in which the heat medium circulates between the air-cooling heat exchanger and the heat-medium and outside-air heat exchanger; and a controller configured to control an operation of the dehumidification mode switching valve such that the first dehumidification mode is switched to the second dehumidification mode, when a refrigerant leak from the refrigeration cycle is determined or detected, or when an amount of the refrigerant within the refrigeration cycle is determined or detected to be less than a predetermined amount.

* * * * *